United States Patent
Shamim et al.

(10) Patent No.: US 10,237,693 B2
(45) Date of Patent: Mar. 19, 2019

(54) SYSTEMS AND METHODS FOR TRACKING A DEVICE IN ZERO-INFRASTRUCTURE AND ZERO-POWER CONDITIONS, AND A TRACKING DEVICE THEREFOR

(71) Applicant: KING ABDULLAH UNIVERSITY OF SCIENCE AND TECHNOLOGY, Thuwal (SA)

(72) Inventors: Atif Shamim, Thuwal (SA); Rana Muhammad Bilal, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 0 days.

(21) Appl. No.: 15/756,764

(22) PCT Filed: Sep. 13, 2016

(86) PCT No.: PCT/IB2016/055443
§ 371 (c)(1),
(2) Date: Mar. 1, 2018

(87) PCT Pub. No.: WO2017/046699
PCT Pub. Date: Mar. 23, 2017

(65) Prior Publication Data
US 2018/0249291 A1   Aug. 30, 2018

Related U.S. Application Data

(60) Provisional application No. 62/220,538, filed on Sep. 18, 2015.

(51) Int. Cl.
*H04W 4/02* (2018.01)
*G01S 19/48* (2010.01)
(Continued)

(52) U.S. Cl.
CPC ............ *H04W 4/023* (2013.01); *G01S 19/48* (2013.01); *H04W 4/02* (2013.01);
(Continued)

(58) Field of Classification Search
CPC .......... G01S 19/48; G01S 5/02; G01S 5/0263; G01S 19/34; G01S 19/42;
(Continued)

(56) References Cited

U.S. PATENT DOCUMENTS

2006/0125694 A1\* 6/2006 Dejanovic ............ C07D 263/58
342/463
2009/0196267 A1   8/2009 Walker
(Continued)

FOREIGN PATENT DOCUMENTS

| EP | 1786143 A2 | 5/2007 |
|---|---|---|
| WO | 2006024298 A1 | 3/2006 |
| WO | 2012059904 A1 | 5/2012 |

OTHER PUBLICATIONS

Amber Alert GPS, "Frequently Asked Questions," (www.amberalertgps.com) (downloaded from the internet Mar. 26, 2018).
(Continued)

*Primary Examiner* — Nam T Huynh
(74) *Attorney, Agent, or Firm* — Patient Portfolio Builders PLLC

(57) ABSTRACT

Disclosed are embodiments for a tracking device having multiple layers of localization and communication capabilities, and particularly having the ability to operate in zero-infrastructure or zero-power conditions. Also disclosed are methods and systems that enhance location determination in zero-infrastructure and zero-power conditions. In one example, a device, system and/or method includes an infrastructure-based localization module, an infrastructure-less localization module and a passive module that can utilize at
(Continued)

least two of the modules to determine a location of the tracking device.

10 Claims, 8 Drawing Sheets

(51) Int. Cl.
  *H04W 52/02* (2009.01)
  *H04W 84/12* (2009.01)
  *H04W 4/80* (2018.01)
(52) U.S. Cl.
  CPC .......... *H04W 52/0229* (2013.01); *H04W 4/80* (2018.02); *H04W 84/12* (2013.01)
(58) Field of Classification Search
  CPC ... G01S 2205/008; H04W 4/02; H04W 4/029; H04W 64/00; H04W 4/80
  See application file for complete search history.

(56) References Cited

U.S. PATENT DOCUMENTS

| | | | | |
|---|---|---|---|---|
| 2011/0199917 A1* | 8/2011 | Karaoguz | ............. | G01S 5/0284 370/252 |
| 2015/0327214 A1* | 11/2015 | Buck, Jr. | ............... | H04W 4/029 455/456.1 |
| 2016/0135009 A1* | 5/2016 | Etchegoyen | ........... | B60G 11/27 455/456.3 |

OTHER PUBLICATIONS

Benavente-Peces, et al., "Global System for Location and Guidance of Disabled People: Indoor and Outdoor Technologies Integration," Fifth International Conference on Networking and Services, Apr. 20-25, 2009, pp. 370-375, IEEE.

Brick House Security, "Spark Nano 5.0", (www.brickhousesecurity.com) (downloaded from the internet Mar. 26, 2018).

Harland Simon, "Tracking Airport Trolleys", Vero Solutions, (www.harlandsimon.com) (downloaded from the internet Mar. 26, 2018).

Isisasset, "Active Sensors vs Passive Sensors," Art Security and RFID Asset Tag Systems from Fortecho, (www.isisasset.com) (downloaded from the internet Mar. 26, 2018).

Karamtot, K.N., et al., "A System for Locating Users of WLAN using Dynamic Mapping in Indoor and Outdoor Environment—LOIDS," Proceedings of the 11th International Conference on Computer and Information Technology (ICCIT 2008), Dec. 25-27, 2008, Khulna, Bangladesh, pp. 156-160, IEEE.

Liao, H.-C., et al., "Seamless Fusion of GPS-VT Service from Outdoor to Indoor Cameras," 3rd International Conference on Awareness Science and Technology (iCAST), Sep. 27-30, 2011, pp. 1-6, IEEE.

Sensitech, United Technologies, "Real-Time Covert Tracking for Global Supply Chain Visibility," VizComm View, VizComm View Sensor Suite, Feb. 2018, (www.sensitech.com) (downloaded from the internet Mar. 26, 2018).

Sensitech, United Technologies, "Real-Time Global Visibility for Life Science Air Shipments," Sentry 500, Air Cargo Tracker, Feb. 2018, (www.sensitech.com) (downloaded from the internet Mar. 26, 2018).

Sensitech, United Technologies, "VizComm GEO Tracker," Jun. 2017, (www.sensitech.com) (downloaded from the internet Mar. 26, 2018).

Stanley Healthcare, "Wearable Wi-Fi Badge Enabling Real-Time Visibility of Hospital Staff," Data Sheet: T3s Staff Badge, KB Article: 7457, May 11, 2017 (www.aeroscout.com) (downloaded from the internet Mar. 26, 2018).

Tabcat Safe & Found, "User Guide," a LOC8TOR brand, (www.loc8tor.com) (downloaded from the internet Mar. 26, 2018).

International Search Report in related International Application No. PCT/IB2016/055443, dated Nov. 24, 2016.

Papapostolou, A., et al., "Exploiting Multi-modality and Diversity for Localization Enhancement: WiFi & RFID usecase," IEEE 20th International Symposium on Personal, Indoor and Mobile Radio Communications (PIMRC 2009), IEEE, Piscataway, NJ, USA, Sep. 13, 2009, pp. 1903-1907.

Written Opinion of the International Searching Authority in related International Application No. PCT/IB2016/055443, dated Nov. 24, 2016.

First Examination Report in corresponding/related GC Application No. 2016-32017, dated Oct. 31, 2018 (Documents D1 and D2 were provided/referenced on the IDS filed Mar. 1, 2018).

\* cited by examiner

SYSTEMS AND METHODS FOR TRACKING A DEVICE IN ZERO-INFRASTRUCTURE AND ZERO-POWER CONDITIONS, AND A TRACKING DEVICE THEREFOR

CROSS-REFERENCE TO RELATED APPLICATION

This application is a U.S. National Stage of International Application No. PCT/IB2016/055443, filed Sep. 13, 2016, which claims the benefit of, and priority to, U.S. Provisional Patent Application No. 62/220,538 entitled "SYSTEMS AND METHODS FOR TRACKING A DEVICE IN ZERO-INFRASTRUCTURE AND ZERO-POWER CONDITIONS, AND A TRACKING DEVICE THEREFOR," filed Sep. 18, 2015, the contents of which are incorporated by their entirety herein.

TECHNICAL FIELD

This application relates to systems and methods for tracking a device in zero-infrastructure and zero-power conditions. This invention also relates to a tracking device for tracking an item in zero-infrastructure and zero-power conditions.

TECHNICAL BACKGROUND

Tracking devices are used today to monitor the location of people or objects in real-time. These devices have certain localization and tracking mechanisms that determine the location (e.g., a GPS location) and/or information relevant to the location of tracking device, such as information associated with GSM, Wi-Fi, RFID, etc. These devices can also employ certain communication mechanisms, such as GSM, GPRS, Wi-Fi, ZigBee, etc., in order to communicate the location information to a user or a server at some distance.

Applications based on these tracking devices may require the target to be localized under an assortment of various situations, such as an outdoor environment with clear sky visibility, an outdoor urban area, known or registered indoor locations, unknown indoor locations, etc. Single communication and single localization mechanisms cannot provide uninterrupted functionality across these changing situations. The existing market solutions do not have devices with multilayered tracking and/or multilayered communication mechanisms, and hence functionality of these solutions is limited to few (mostly one) situations.

A majority of commercial tracking products are only GPS-based and are unable to function in various indoor environments. Further, a well-recognized use of GPS in theft recovery situations has given rise to the use of jamming devices by wrongdoers, thereby rendering a majority of current market devices used for this purpose impractical. Moreover, existing solutions are incapable of localizing a target object under various situations including unknown indoor locations or a battery outage on the tracking device. Finally, weight, size, battery life, and existing infrastructure associated with current tracking devices remains problematic.

DISCLOSURE OF THE INVENTION

A tracking device can include more than one capability to localize (i.e., determine a location of) the tracking device or an item associated therewith. For example, a tracking device can include a module for localizing via a global positioning system (GPS) and another different module for localizing via a global system for mobile communications (GSM). However, many circumstances may arise where GPS and GSM are unable to localize the tracking device. For example, a tracking device in a shipping container may lack an ability to localize via GPS or GSM when the shipping container is in a warehouse or when the shipping container is out to sea on a cargo ship. Accordingly, the tracking device is unable to localize the shipping container from an originating location to a destination location. Additional costs and burdens are created to localize the tracking device and its corresponding shipment at the most critical times in shipping.

According to various embodiments described herein, a location of a device (e.g., a tracking device) can be determined utilizing a combination of localization techniques, such as infrastructure-based localization, infrastructure-less localization, and/or passive localization. As will be described herein, "infrastructure-based" localization schemes refer to localization techniques that utilize existing localization, communication, and network infrastructure, such as satellites, cellular towers, wireless access points, etc. In comparison, "infrastructure-less" localization schemes use a power source, such as a battery, to originate a signal from the tracking device or mobile computing device capable of being received in a point-to-point setting, and capable of being used, for example, to estimate a position of the tracking device. Although signals generated by a tracking device or a mobile computing device can be received in a point-to-point setting (e.g., without infrastructure), information perceived by this signal can be communicated to a server or another computing device utilizing a communication mechanism, such as GSM. Further, the nature of the signal being generated may be acoustic, ultrasonic, radio wave, or other type of signal. Passive localization schemes refer to localization techniques using passive devices, such as passive radio-frequency identification (RFID) tags. The passive devices can use an external signal that provides sufficient power to the passive RFID tag to communicate data from the passive RFID tag.

In various aspects, systems, methods, and other features are described herein for a tracking device capable of seamless tracking from an origination location to a destination location despite the unforeseeable environments in which the tracking device may be found. The tracking device can be multi-layered; to this end, a person or computing environment periodically or constantly monitoring locations of the tracking device may be provided with fewer downtimes or no down times at all (e.g., periods where the tracking device is unable to be located).

Briefly described in one or more embodiments, a device, system, and/or method to determine a location of a tracking device are provided comprising at least two modules selected from a group consisting of: a localization module implementing at least one infrastructure-based localization technique; a localization module implementing at least one infrastructure-less localization technique; and a localization module implementing at least one passive localization technique.

In any one or more aspects of the device, system, and method information obtained from at least two of the localization modules is utilized in determining the location. For example, information obtained via the at least one passive localization technique can be combined with information obtained via either the infrastructure-based localization technique, the infrastructure-less localization technique, or both. Information obtained via the at least one infrastructure-based localization technique can be utilized in determining the location using the at least infrastructure-less localization technique, the at least one passive localization technique, or both.

In any one or more aspects, the localization module implementing the at least one infrastructure-less localization technique can be activated on the tracking device responsive to the tracking device receiving an instruction from a server computing device or a mobile computing device. The localization module implementing the infrastructure-less localization technique can be activated in response to an insufficient signal condition being detected by the localization module implementing the infrastructure-less localization technique or by the localization module implementing the infrastructure-based localization technique. The localization modules can be kept in a sleep state or a low power state and activated periodically. A configuration message received by the tracking device from a server computing device or a mobile computing device can be stored in network memory over a communication network and delivered to the tracking device upon a periodic activation of at least one of the communication modules. Responsive to detecting reception of the configuration message received from the server computing device, at least one of the communication modules can be kept in a partially activated state or a fully activated state while other ones of the communication modules are in a sleep state.

An embodiment among others is a system and/or method for a tracking device capable of localizing in a multitude of situations and environments, including those that make localization problematic, wherein the system and method comprise: (a) attempting to determine a location of the tracking device utilizing a first localization module within a tracking device; (b) responsive to the location being undetermined utilizing the first localization module, attempting to determine the location of the tracking device utilizing a second localization module within the tracking device; (c) responsive to the location being undetermined utilizing the second localization module, attempting to determine the location of the tracking device utilizing a third localization module within the tracking device; and (d) responsive to the location being undetermined utilizing the third localization module, initiating transmission of a signal from the tracking device, such as a signal capable of detection by a local computing device. In an aspect the tracking device of the system and/or method can be configured to determine a location of the tracking device utilizing location data received from the tracking device. The location can be determined by a server computing device utilizing at least an identifier corresponding to the tracking device.

In any one or more aspects of the device, system and/or method, a location of the tracking device can be obtained using at least two of the infrastructure-based localization, the infrastructure-less localization and the passive localization. In any one or more aspects, a location of a tracking device can be determined utilizing passive localization and at least one of an infrastructure-based localization or an infrastructure-less localization or both.

In any one or more aspects of the aforementioned embodiments of the device, system and/or method, the at least one infrastructure-based localization technique can be a satellite-based trilateration technique. The satellite-based trilateration technique can be selected from a group consisting of GPS, GLONASS, NAVSTAR, and combinations thereof. The at least one infrastructure-based localization technique can be a mobile communication technology. The mobile communication technology can be one or more of GSM, GPRS, CDMA, WCDMA, EDGE, HSPA, UMTS, or HSDPA. The at least one infrastructure-based localization technique can be a networked wireless communication technique. The networked wireless communication technique can be one or more of Wi-Fi, LiFi, MiFi, WLAN, WiMAX, or any other networked wireless communication technique.

In various embodiments, the at least one infrastructure-based localization technique can be a short-range communication technique in a networked setting. Further, the short-range communication technique can be one or more of Bluetooth, ZigBee, Xbee, or RFID. The at least one infrastructure-less localization technique can be a mobile communication technology used, for example, in a point-to-point setting between the tracking device and a mobile computing device. In some embodiments, the mobile communication technology can be one or more of GSM, GPRS, CDMA, WCDMA, EDGE, HSPA, UMTS, or HSDPA. The at least one infrastructure-less location technique can be a networked wireless communication technology used, for example, in a point-to-point setting between the tracking device and a mobile computing device. The networked wireless communication technique can be one or more of Wi-Fi, LiFi, MiFi, WLAN, or WiMAX. The at least one infrastructure-less localization technique can be a short-range communication technology used, for example, in a point-to-point setting between the tracking device and a mobile computing device. The short-range communication technique can be one or more of Bluetooth, ZigBee, Xbee, or RFID. The at least one passive localization technique can be one or more of RFID or NFC or both.

In any one or more aspects, the device and the method can further include at least one communication module. The device and method can include at least one microcontroller configured to control the localization modules or at least one communication module. The localization module implementing the at least one infrastructure-based localization technique can be further used for communication with a server computing device.

In various aspects, sharing of hardware resources is provided among the multiple localization techniques as well as communication mechanisms/techniques for optimizing area, weight, power & cost. As a non-limiting example, the device, system and/or method can use Wi-Fi hardware for Infrastructure based localization, Infrastructure less localization and communication, or use GSM hardware for Infrastructure based localization and communication.

In various aspects, the device, system and/or method can put one or more components in shutdown or low-power state for power saving, waking the one or more components on periodic intervals or motion sensing. Configuration messages from a server whilst one or more components are in shutdown/low-power/sleep can be stored in a network memory/buffer and delivered to device on waking up.

In any one or more aspects the infrastructure less localization mechanisms/techniques can be kept in a powered down state. The hardware resource concerning the Infrastructure less technique can already be continuously or periodically active, for instance Wi-Fi hardware may be used for communication or Infrastructure based localization. The device, system and/or method can provide for activation of the Infrastructure less localization mechanism/technique, i.e. initiation of transmission of a signal from device or initiation of receiving a signal and reporting to server, upon reception of a relevant configuration message from server or upon reception of a relevant configuration message from a hand-held/mobile computing device or upon failure to establish communication with a server.

In any one or more aspects, the device, system and/or method can keep the infrastructure based localization mechanism/technique and/or communication mechanisms on a device in powered down state. Activation of these mechanisms upon loss of connection and/or a failure to determine location using Infrastructure less or passive localization techniques/mechanisms can be provided.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION OF THE INVENTION

Figure 1A:
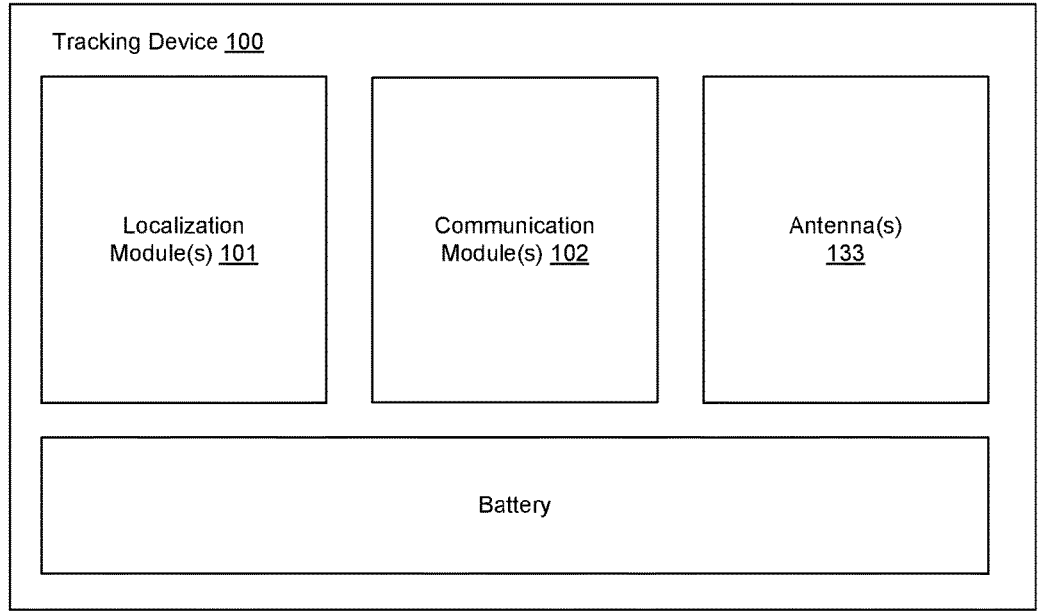
FIGS. 1A-1B are schematic block diagrams that provide exemplary illustration of a tracking device according to various embodiments of the present disclosure.

Described below are various embodiments of the present systems and methods for tracking a device in zero-infrastructure and zero-power conditions, and a tracking device therefor. Although particular embodiments are described, those embodiments are mere exemplary implementations of the system and method. One skilled in the art will recognize other embodiments are possible. All such embodiments are intended to fall within the scope of this disclosure. Moreover, all references cited herein are intended to be and are hereby incorporated by reference into this disclosure as if fully set forth herein. While the disclosure will now be described in reference to the above drawings, there is no intent to limit it to the embodiment or embodiments disclosed herein. On the contrary, the intent is to cover all alternatives, modifications and equivalents included within the spirit and scope of the disclosure.

Before the present disclosure is described in greater detail, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

All publications and patents cited in this specification are herein incorporated by reference as if each individual publication or patent were specifically and individually indicated to be incorporated by reference and are incorporated herein by reference to disclose and describe the methods and/or materials in connection with the cited publications. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

The present disclosure relates to a tracking device that is capable of operation in zero-infrastructure (infrastructure-less localization) and zero-power (passive localization) conditions, as well as systems and methods for tracking the device. Such devices may be used within an end-to-end system to provide a secure, user-friendly, and globally accessible monitoring service capable of tracking objects around the globe.

As may be appreciated, tracking devices are used today to monitor the location of people or objects in real-time. These devices have certain localization, communication, and tracking mechanisms that determine the location and/or information relevant to the location of the tracking device. For example, localization mechanisms can include GPS or other similar mechanisms. Communication mechanisms can include GSM, GPRS, Wi-Fi, ZigBee, or other suitable mechanism capable of communicating location information to a user or a server at some distance, for example, across a network. The target object to be localized may encounter an assortment of various situations, such as an outdoor environment with clear sky visibility, an outdoor urban area, known or registered indoor locations (i.e., RF infrastructure like Wi-Fi, Bluetooth, ZigBee, etc., listed in server's database), unknown indoor locations (i.e., with no RF infrastructure or infrastructure unknown to server database), etc.

Each localization and/or communication mechanism can be functionality optimized for a particular situation. For instance, GPS is de-facto standard for localization during an outdoor clear sky situation; however, it is notoriously unreliable for localization in indoor or urban areas. Thus, single communication and single localization mechanisms cannot provide uninterrupted functionality across various changing situations. Further, the existing market solutions do not commonly support multilayered tracking, and hence functionality is limited to few (mostly one) situations.

A majority of commercial tracking products are GPS-based only and cannot function in an indoor environment. Further, GPS is well recognized for use in theft recovery situations that have given rise to the use of jamming devices by wrongdoers, thereby rendering majority of current marketing devices for this purpose, impractical. Existing solutions are incapable of localizing the target object under situations like unknown indoor locations or battery outage on the tracking device. Weight, size, and battery life of current tracking devices also remain problematic.

Tracking solutions that support indoor localization generally require expensive infrastructure placement and maintenance at relatively proximate intervals. For example, RFID-based tracking devices require RFID readers to be installed and located every so many feet for a seamless communication/localization network to exist.

The present disclosure addresses these various deficiencies. In one or more embodiments, the present disclosure provides a tracking device, and a system for monitoring the tracking device, having multiple layers of localization and communication capabilities, including the ability to operate in zero-infrastructure and zero-power conditions. To this end, in various embodiments, a tracking device can include one or more localization modules, one or more communications modules, one or more passive and/or active communication modules, and other components, as will be described.

In various aspects of the present disclosure, known infrastructure, such as GPS satellites, GSM cell towers, Wi-Fi access points, Bluetooth nodes, ZigBee nodes, RFID readers, etc., can be used to determine a location of a tracking device within a coverage area of infrastructure. Techniques such as nearest neighbor, trilateration, triangulation, etc., can be employed to calculate the position of a tracking device with reference to the position of one or more infrastructure nodes that are in communication with the tracking device. The infrastructure node can represent a GPS or other satellite, GSM cell tower, Ultrasound transmitter, receiver, or transceiver, etc., depending on the specifics of the infrastructure-based localization scheme being used. To establish communication between infrastructure node(s) and the tracking device, a signal can be originated from the tracking device that is received by the infrastructure node(s) (e.g., by activating the RFID). Similarly, the signal can be originated from infrastructure nodes that are received by the tracking device (e.g., GPS). In various embodiments, signals can be transmitted from both the tracking device and the infrastructure node(s) under some particular protocol or scheme (e.g., GSM, Wi-Fi, Passive RFID, etc.). This class of localization techniques is henceforth referred as "infrastructure-based" localization techniques.

More than one infrastructure-based localization technique can be employed in a single tracking device to provide localization under various conditions that the tracking device may encounter. For instance, GPS, GSM, Wi-Fi, and RFID can be combined in a single tracking device with a GPS component providing location information in outdoor clear sky conditions; a GSM component providing location in tunnels, urban areas, and other situations with insufficient GPS signals; a Wi-Fi component providing location inside some particular buildings (e.g., buildings with Wi-Fi infrastructure that has been registered in a database); and an RFID component providing location inside some particular warehouses (e.g., where dedicated RFID reader infrastructure has been installed for this purpose). Information from one localization technique can be used as an activation signal for other localization techniques. For instance, RFID and/or Wi-Fi infrastructure might be in a sleep or an off state and can be activated responsive to a lack of location information being obtained by GPS or GSM while the tracking device in the vicinity of coverage area in Wi-Fi or RFID infrastructure.

In areas with little to no infrastructure, position information of some or all infrastructure node(s) is not available. In such areas an infrastructure-less localization technique can be applied. For example, a signal transmission between the tracking device and a mobile computing device can be used to determine the location of the tracking device with reference to the position of mobile computing device. A signal can be originated from the mobile computing device or the tracking device. A power source, such as a battery, can be used to originate a signal from the tracking device. The signal can be received in a point-to-point setting and can be used, for example, to estimate a position of the tracking device (e.g., active RFID, battery-assisted passive (BAP) RFID, etc.). Cases where a GSM signal, a Wi-Fi signal, or a similar signal (e.g., obtained by communication between the tracking device and infrastructure node(s) from an unknown infrastructure) is "sniffed" or detected by the mobile computing device, or cases where the mobile computing device imitates itself as an infrastructure node of unknown infrastructure (e.g., instance GSM sniffing), also fall under the category of infrastructure-less localization techniques.

Information from other localization techniques can be used to assist in infrastructure-less localization and/or can be used to activate infrastructure-less localization modules on a tracking device. For instance, consider a tracking device containing GPS, GSM, and ZigBee modules, wherein the tracking device is configured so it is in a sleep condition and is further configured to activate at periodic intervals to check GPS and GSM locations. If the tracking device communicates with a server computing device using GSM, the last known location from GPS and/or a crude location from GSM can indicate a presence of the tracking device inside a particular building. A mobile computing device can be sent inside that building to pinpoint the location of tracking device inside that building using infrastructure-less localization.

A configuration message may originate from the server computing device that instructs the tracking device to turn on a ZigBee module (or other similar module) and start emitting a signal which might be received on the mobile computing device for position estimation. The configuration message may alternatively instruct the tracking device to return to the sleep condition with the GSM module (or any other communication module) partially activated so as to receive signals, but not transmit. The mobile computing device can then proceed to the area and ask the tracking device using GSM (or any other communication module) to activate its infrastructure-less localization module, e.g., ZigBee.

The tracking device can activate its infrastructure-less localization modes if it is unable to communicate with the server computing device and/or is unable to infer any information about its location. For instance, consider a tracking device that goes inside a silo and loses or is unable to obtain a GSM signal. In this case, the server computing device cannot instruct and/or communicate with the tracking device to cause an emission of a beacon signal (e.g., infrastructure-less localization mode) so that it can be tracked with the mobile computing device. However, the tracking device may self-enable the infrastructure-less localization module after finding that it is unable to contact the server computing device. Now, a mobile computing device can be sent to the vicinity of the tracking device using, for example, the last known location from the infrastructure-based or other localization mechanism, and can be used to locate the tracking device using a beacon signal being emitted from the tracking device.

Under conditions in which the battery onboard the tracking device depletes, communication between a mobile tracking device and a passive module (such as passive RFID, NFC, etc.) can be used to determine a location of the tracking device with reference to the position of mobile computing device. Similar to the case of infrastructure-less localization, information from other localization techniques can be used to assist in passive localization and/or may be used to activate passive localization modules on a tracking device.

Components (hardware, firmware, software, etc.) for any of the localization techniques discussed above can reside completely inside the tracking device, or may be distributed between computing devices, networks, tracking devices, client devices, etc. This means that complete functionality of multilayered tracking may be provided solely by the tracking devices or by the end-to-end system. To this end, hardware resources may be shared among multiple tracking devices, computing devices, networks, client devices, etc., as well as communication mechanisms that optimize operation based on area, weight, power, cost, etc. For example, a Wi-Fi module of a tracking device may be utilized for infrastructure-based localization, Infrastructure-less localization, and communication with remote computing devices. In another example, a GSM module of a tracking device may be utilized for infrastructure-based localization as well as communication with remote computing devices.

Finally, certain localization and communication mechanisms/techniques can share physical resources and hardware. For instance, hardware associated with GSM, GPRS, Wi-Fi, etc., can be employed for localization as well as communication, thereby enhancing functionality and reducing weight, size, and cost. Similarly, Wi-Fi, GSM, ZigBee, etc., modules may be employed for infrastructure-based localization, infrastructure-less localization, as well as for communication.

Configuration messages or other messages can be communicated between the computing device(s) and the tracking device. Under certain conditions, such as when tracking device is in a sleep or low power state, these messages can be stored in a network memory in the communication network and delivered to the desired destination later (such as when tracking device wakes up). For instance, an SMS originated from a server computing device can be stored in GSM network (in case GSM module of tracking device is powered off) and delivered to the tracking device when it activates its GSM module.

To this end, in one or more aspects of the present disclosure, a tracking device can comprise a plurality of localization modules capable of providing multiple layers of tracking. Localization data can be obtained via the localization modules and stored locally on the tracking device. Tracking devices may contain at least one communication module configured to communicate the localization data to a server at predefined times. If the communication module is unable to establish communication with the server, an alternative communication module may be employed.

As may be appreciated, as non-limiting examples, the tracking devices and the systems for monitoring the tracking devices discussed herein provide localization services that may include cargo tracking, shipment tracking, stolen vehicle recovery, etc. For example, in shipment tracking, a tracking device may be placed in a temperature sensitive shipment whereby the contents need to remain in a specified temperature range. The shipment may contain enough preservation material (e.g., dry ice) to maintain the specified temperature range for two weeks. As may be appreciated, the shipment may be delivered internationally by sea, air, and/or land. Though an actual transit path of the shipment may be one week, additional time may be required for warehouse storage, custom clearance, etc. Utilizing the tracking device, a supply chain department may monitor the shipment on a computer or smartphone.

As a non-limiting example, a shipment may originate from a warehouse and be delivered to a seaport on land freight for overseas shipment. The tracking device on the shipment may be configured to send position updates as location data on (predefined) regular intervals, indicative of the passage towards the seaport. The supply chain department may notice that shipment is still at seaport when it should have been placed on sea freight earlier. The supply chain department may then take necessary actions to expedite the shipment.

Next, the shipment may be delivered through sea and air freight, while the tracking device provides position updates according to the predefined regular intervals when able to do so. Several days later, for example, the shipment may reach a warehouse in a port in the destination city. Though the manual system of the destination port's warehouse has not yet registered or declared the subject shipment as arrived, per the position update of tracking device, an extraction team may be sent by the supply chain department. A beacon mode (e.g., infrastructure-less localization) of the tracking device may be activated remotely from the computer or smartphone (i.e., a client device). The extraction team may arrive at the warehouse and use the audio or visual cues on a handheld device (e.g., a mobile computing device) to locate the shipment in situations where the warehouse has no infrastructure and even in situations when a power supply of the tracking device has depleted.

As will be described herein, in one or more aspects of the present disclosure, a tracking device can comprise at least two modules selected from a group consisting of a localization module implementing at least one infrastructure-based localization technique, a localization module implementing at least one infrastructure-less localization technique, and a localization module implementing at least one passive localization technique. The at least one infrastructure-based localization technique can be a satellite-based trilateration technique such as GPS, GLONASS, or NAVSTAR. Alternatively, the at least one infrastructure-based localization technique can be a mobile communication technology, such as GSM, GPRS, CDMA, WCDMA, EDGE, HSPA, UMTS, or HSDPA. In alternative embodiments, the at least one infrastructure-based localization technique can be a networked wireless communication technique, such as Wi-Fi, LiFi, MiFi, WLAN, or WiMAX. In various embodiments, the at least one infrastructure-based localization technique can be a short-range communication technique in a networked setting, a point-to-point setting, or a combination thereof, such as Bluetooth, ZigBee, Xbee, or RFID.

In various embodiments, the at least one infrastructure-less localization technique can be a mobile communication technology, such as GSM, GPRS, CDMA, WCDMA, EDGE, HSPA, UMTS, or HSDPA. Alternatively, the at least one infrastructure-less localization technique can be a networked wireless communication technique such as Wi-Fi, LiFi, MiFi, WLAN, or WiMAX, or a short-range communication technique such as Bluetooth, ZigBee, Xbee, or RFID.

At least a portion of the device can be fabricated using conductive ink printing and, in various embodiments, the tracking device, or portions thereof, can be fabricated on a flexible substrate. In various embodiments, the at least one passive localization technique may be RFID or NFC.

In the following discussion, various aspects of a general description of the present system and its components are provided, followed by a discussion of the operation of the same.

With reference to FIG. 1A, shown is a schematic diagram of a non-limiting embodiment of a multi-layered tracking device (hereinafter referred to as the tracking device 100). The multi-layered tracking device 100 can be configured to operate in zero-infrastructure and zero-power conditions. In the non-limiting example of FIG. 1A, the tracking device 100 can comprise one or more localization modules 101 capable of using infrastructure, such as GPS infrastructure, to obtain location or localization data from a satellite, tower, or other suitable source. In some embodiments, the localization module 101 includes a GPS module.

Further, the tracking device 100 can include one or more communication modules 102 that are capable of transmitting location or localization data gathered from localization modules 101 over various communication media. For example, the communication module 102 can include, for example, a GSM module, GPRS module, Wi-Fi module, Bluetooth module, ZigBee module, or other suitable module. The tracking device 100 can also include antennas 133, if needed by the localization modules 101 and/or the communication modules 102. Further discussion of a tracking device 100 is discussed below with respect to FIG. 1B.

Figure 1B:
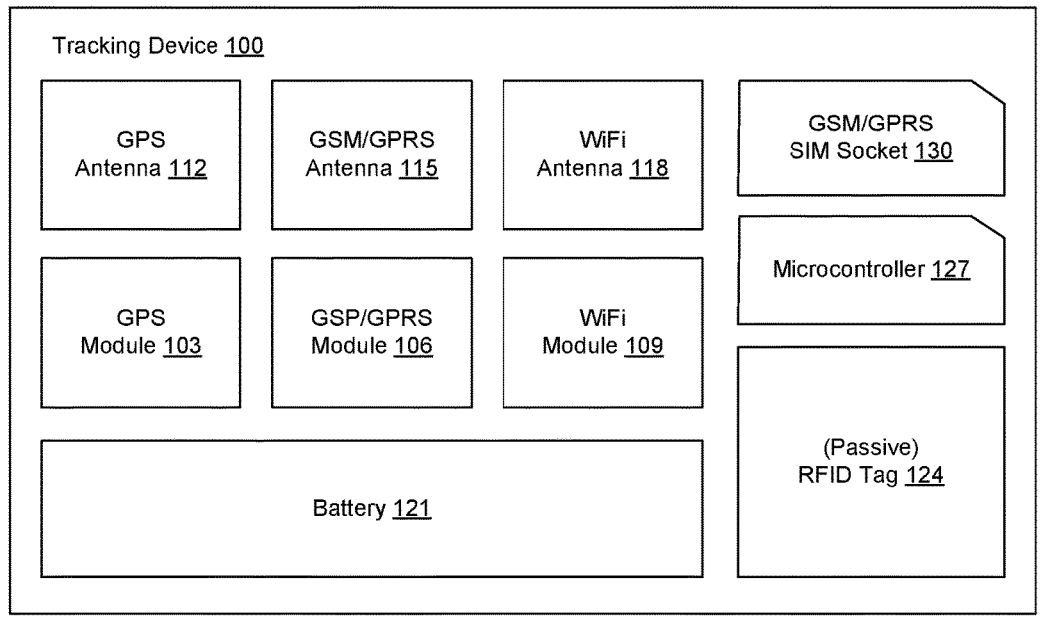

With reference to FIG. 1B, shown is a schematic diagram of a non-limiting embodiment of a tracking device 100. The tracking device 100 is capable of operation in zero-infrastructure and zero-power conditions.

In the non-limiting example of FIG. 1B, the tracking device 100 can comprise one or more communication modules 102 capable of transmitting localization data gathered from localization modules 101 over various communication media. For example, the tracking device 100 can comprise a global system for mobile communications (GSM) and general packet radio service (GPRS) module (hereinafter GSM/GPRS module 106) and/or a wireless fidelity (Wi-Fi) module 109. To this end, the tracking device 100 may comprise a GSM/GPRS antenna 115 and/or a Wi-Fi antenna 118 to send or receive transmissions via the communication modules. The communication modules can be powered by a battery 121 or similar power source.

Further, in the non-limiting example of FIG. 1B, the tracking device 100 can include one or more localization modules 101 in each of a number of different localization categories including infrastructure-based localization, such as GPS, GSM, Wi-Fi, Bluetooth, ZigBee, ultrasound and RF, infrastructure-less localization such as Wi-Fi, ZigBee, RF, sonic and ultrasound beaconing, and passive localization (such as passive RFID). For example, the tracking device 100 may comprise a global positioning system module 103, a global system for mobile communications (GSM), a general packet radio service (GPRS) module (hereinafter GSM/GPRS module 106), and/or a wireless fidelity (Wi-Fi) module 109. Some of these localization modules 101 or communication modules 102, such as GSM, Wi-Fi, ZigBee, etc., may also be used for miniaturization, redundancy, and power/cost optimization. To this end, the tracking device 100 may comprise a GPS antenna 112, a GSM/GPRS antenna 115, and/or a Wi-Fi antenna 118 to send or receive transmissions via the localization modules 101 and/or the communication modules 102. The communication modules may be powered by a battery 121 or similar power source.

According to various embodiments, the tracking device 100 may further comprise an RFID tag 124. Although the tracking device 100 is shown in FIG. 1B as comprising a passive RFID tag 124 (or a semi-passive RFID tag), it is understood that an active RFID tag 124 may be similarly employed, although an active RFID tag 124 can require power from the battery 121 or similar power source. The tracking device 100 further comprises a microcontroller 127 configured to control the communication and localization modules 101, the RFID tag 124, and/or other electronic components within the tracking device 100. According to various embodiments, the microcontroller 127 may comprise, or be in data communication with, memory to store localization data obtained by the localization modules 101 for transmission at periodic intervals.

Next, a description of an example operation of the tracking device 100 of FIGS. 1A-B is provided. As may be appreciated, the GPS module 103 of the tracking device 100 can capture signals from GPS satellites. These signals can be processed to determine a location of the tracking device 100. Accordingly, the GPS module 103 provides a layer of tracking that is capable of localizing the tracking device 100 in situations where GPS signal quality is suitable. For example, when the tracking device 100 is located outdoors with a clear sky, the GPS module 103 can be employed in the determination of the location of the tracking device 100.

Further, the GSM/GPRS module 106 can be configured to scan GSM frequency bands to locate one or more visible GSM cellular towers. Upon detection of at least one visible GSM cellular tower, an identifier of the GSM cellular tower and/or a respective signal strength of the GSM cellular tower can be communicated to a central server for determination of the location of the tracking device 100. As may be appreciated, if two or more cellular tower identifiers and respective signal strengths are available, a central server can utilize triangulation, trilateration, fingerprint matching, etc., to determine the position of the tracking device 100. In the event that only one cellular tower is visible, a central server can use a nearest neighbor algorithm to localize the tracking device 100. The GSM/GPRS layer of localization can be used to localize the tracking device 100 in outdoor and indoor situations with weak GPS signals, such as underground, inside tunnels, within urban areas, inside warehouses, inside parking garages, etc.

The Wi-Fi module 109 is configured to scan Wi-Fi frequency bands and send any visible and detected Wi-Fi access point (AP) identifiers and/or respective signal strengths to a central server. If two or more access points and/or respective signal strengths are available, a central server may utilize triangulation, trilateration, fingerprint matching, etc., to determine the position of the tracking device 100. In the event that only one wireless access point is visible, a central server may use a nearest neighbor algorithm to localize the tracking device 100. The Wi-Fi layer of localization may be used to localize the tracking device 100 in indoor locations which may have been pre-mapped (i.e., locations in which their RF infrastructure has been added or registered in a database accessible by the central server) or covered by a relevant third-party database (e.g., OpenCellId). These locations may include warehouses, neighborhoods, apartment complexes, sea ports, and airports, etc. The aforementioned localization mechanisms fall under the category of infrastructure-based localization mechanisms.

According to various embodiments, the Wi-Fi module 109 is further configured to emit its own Wi-Fi signal (effectively imitating a Wi-Fi access point), thus providing its own beaconing function. The emitted Wi-Fi signal is capable of being detected by a mobile computing device (not shown), such as a handheld device configured to locate the tracking device 100 in local situations, such as in a warehouse or in a silo. As may be appreciated, the mobile computing device may generate acoustic and/or visual cues to guide an operator of the handheld device towards the location of the tracking device 100 according to readings obtained from the Wi-Fi signal. This localization mechanism falls under the category of infrastructure-less localization (zero infrastructure tracking). This layer of tracking localizes the tracking device 100 in indoor situations (such as warehouses or silos), which have no RF infrastructure (such as Wi-Fi, ZigBee, Bluetooth, etc.), or in circumstances when databases of installed infrastructure are not available.

The infrastructure-based localization mechanisms described above provide a trail of the vicinity of unregistered indoor location. The infrastructure-less localization mechanism of Wi-Fi beaconing, for example, allows pinpointing the tracking device in an indoor location. Utilizing a mobile computing device, a location of the tracking device 100 may be pin-pointed in an indoor or outdoor location without existing infrastructure.

Similarly, the RFID tag 124 is configured to be read using an appropriate mobile computing device, such as a handheld RFID reader. As described above, the mobile computing device can generate acoustic and/or visual cues to guide an operator towards the location of the tracking device 100 according to readings obtained from the RFID tag 124. As may be appreciated, a passive RFID tag 124 utilizes the power provided via the mobile computing device instead of the battery 121 of the tracking device 100. To this end, the passive RFID tag 124 does not require power form the battery 121 to operate. Accordingly, the RFID layer of tracking localizes the tracking device 100 in situations when the battery 121 has dissipated and/or when the tracking device 100 is unable to employ the active localization techniques described above. Further, the use of the RFID tag 124 in tracking does not require infrastructure (e.g., Wi-Fi access points, cellular towers). It provides a passive localization mechanism (zero power tracking).

Although the tracking device 100 shown in FIG. 1B employs a GPS module 103, a GPS/GPRS module 106, a Wi-Fi module 109, and an RFID tag 124, other receivers, transceivers, or tags may be utilized to permit the tracking device 100 to localize via alternative localization strategies. For example, other communication modules may be employed using technologies such as Ultrasonic, Z-wave, ZigBee, Bluetooth, etc.

The tracking device 100 may further comprise a GSM/GPRS SIM socket 130 configured to facilitate the addition of portable electronics or other circuitry to the tracking device 100. As a non-limiting example, a subscriber identification module (SIM) card may be used to facilitate an identification of the tracking device 100 via a mobile communications system based on data residing within the SIM card (e.g., a unique identifier for the tracking device 100).

Figure 2:
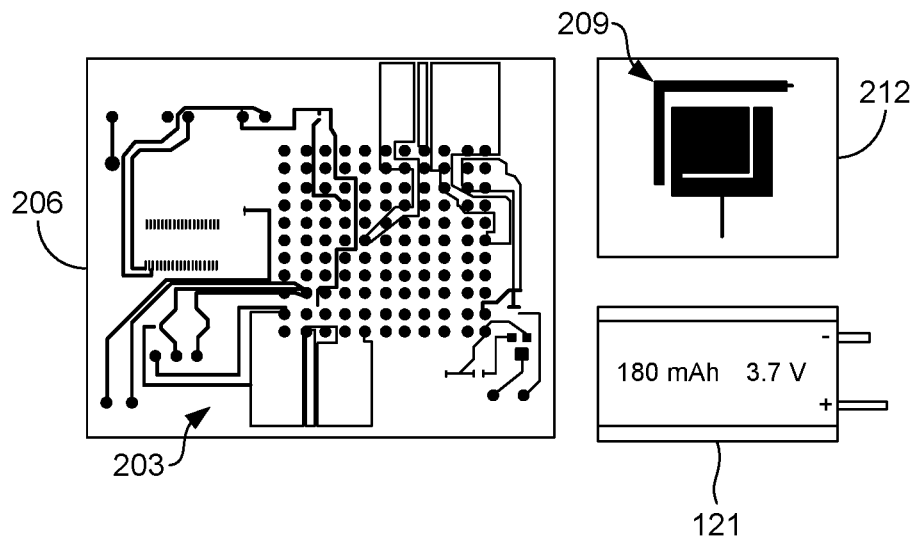
FIG. 2 is a drawing of individual components that may be employed in the creation of the tracking device.

Moving on to FIG. 2, shown is at least a portion of the components that may be employed in the tracking device 100 of FIGS. 1A-1B. According to various embodiments, the tracking device 100 may or may not comprise components mounted and/or fabricated by conventional methods, such as PCB milling, photo etching, pick'n place, solder reflow, etc., or a combination thereof. Further, in various embodiments, the tracking device 100 may or may not comprise components printed using, for example, an inkjet printer or similar technology, such as those created using stencil printing, gravure printing, etc. In the non-limiting example of FIG. 2, the tracking device 100 may comprise circuitry 203 printed on a circuitry substrate 206, one or more antennas 209 printed on an antenna substrate 212, and a battery 121. The circuitry substrate 206 and/or the antenna substrate 212 may comprise, for example, paper, plastic, silicon, polymer, or other lightweight and/or flexible material.

As a non-limiting example, by using relatively inexpensive inkjet and/or screen printing technology, an inkjet printer can employ conductive ink to print a complete and/or partial circuit on a substrate, the circuit capable of being combined with additional circuitry, such as the components of the localization modules 101 and/or communication modules 102 of FIG. 1A which are not capable of being printed. As may be appreciated, conductive ink may comprise ink having conductive nanoparticles, nanotubes, and/or other conductive materials such as gold, silver, copper, silicon, and/or any combination thereof. Various paper and/or plastic substrates may be employed such that flexing and/or bending of the circuit is accomplished without damage to the printed circuit, and the substrate and/or the conductive ink may be selected to be environmentally friendly. In the case of an inkjet printer, the thickness of the substrate may be selected for use in the printer.

In order to power a tracking device, a battery 121 may comprise, for example, a flexible battery or a conventional battery. A flexible battery, for example, may be capable of being folded or bent without compromising the integrity of the battery 121. Such batteries may be printed using nanotube ink or may be commercially available (e.g., flexible lithium-ion, flexible nickel-cadmium batteries, etc.). When combined with flexible circuitry, the combination of the circuitry 203 and the battery 121 may also be capable of being folded or bent without compromising the integrity of the tracking device 100. Alternatively, a tracking device 100 may comprise any other power source in lieu of the battery 121. Additionally, the battery 121 can be combined with various recharging circuitry (not shown). Recharging circuitry, for example, can comprise a solar panel, perpetual motion recharging circuitry, and/or other recharging circuitry. Although FIG. 2 shows components that can be printed, for example, using an inkjet printer, the tracking devices 100 may employ conventional components (e.g., microchips, printed circuit boards, etc.), printed components, or a hybrid of both convention and printed components.

Figure 3:
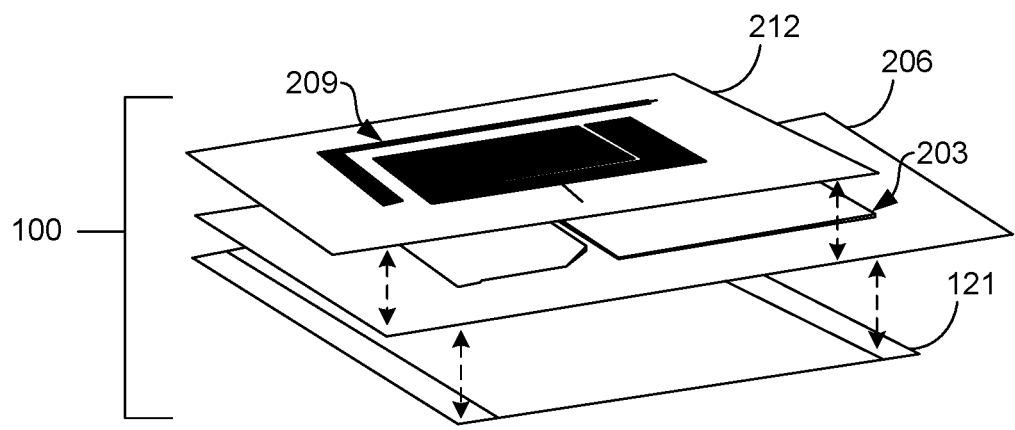
FIG. 3 is a drawing of individual components that may be employed in the creation of the tracking device.

With reference to FIG. 3, shown is at least a portion of the layers that can be employed in an example embodiment of the tracking device 100 created using the components described above with respect to FIGS. 1-2. In the non-limiting example of FIG. 3, the tracking device 100 may comprise the circuitry 203 printed on the circuitry substrate 206, the one or more antennas 209 printed on the antenna substrate 212, and the battery 121, as well as any communication and localization modules 101 described above. In one embodiment, the circuitry 203 printed on the circuitry substrate 206 may be combined with the one or more modules described above with respect to FIGS. 1A-1B, wherein the tracking device 100 may comprise, for example, receivers, transmitters, transceivers, and/or other localization and/or communication circuitry.

By using lightweight and inexpensive substrates, the circuitry 203 may be combined with the one or more antennas 209 and the battery 121 to create a durable and lightweight tracking device 100 capable of inexpensive reproduction. The layers of the individual components of the tracking device 100 of FIG. 3 may be combined to form the tracking device 100 described above with respect to FIGS. 1A-1B.

Figure 4:
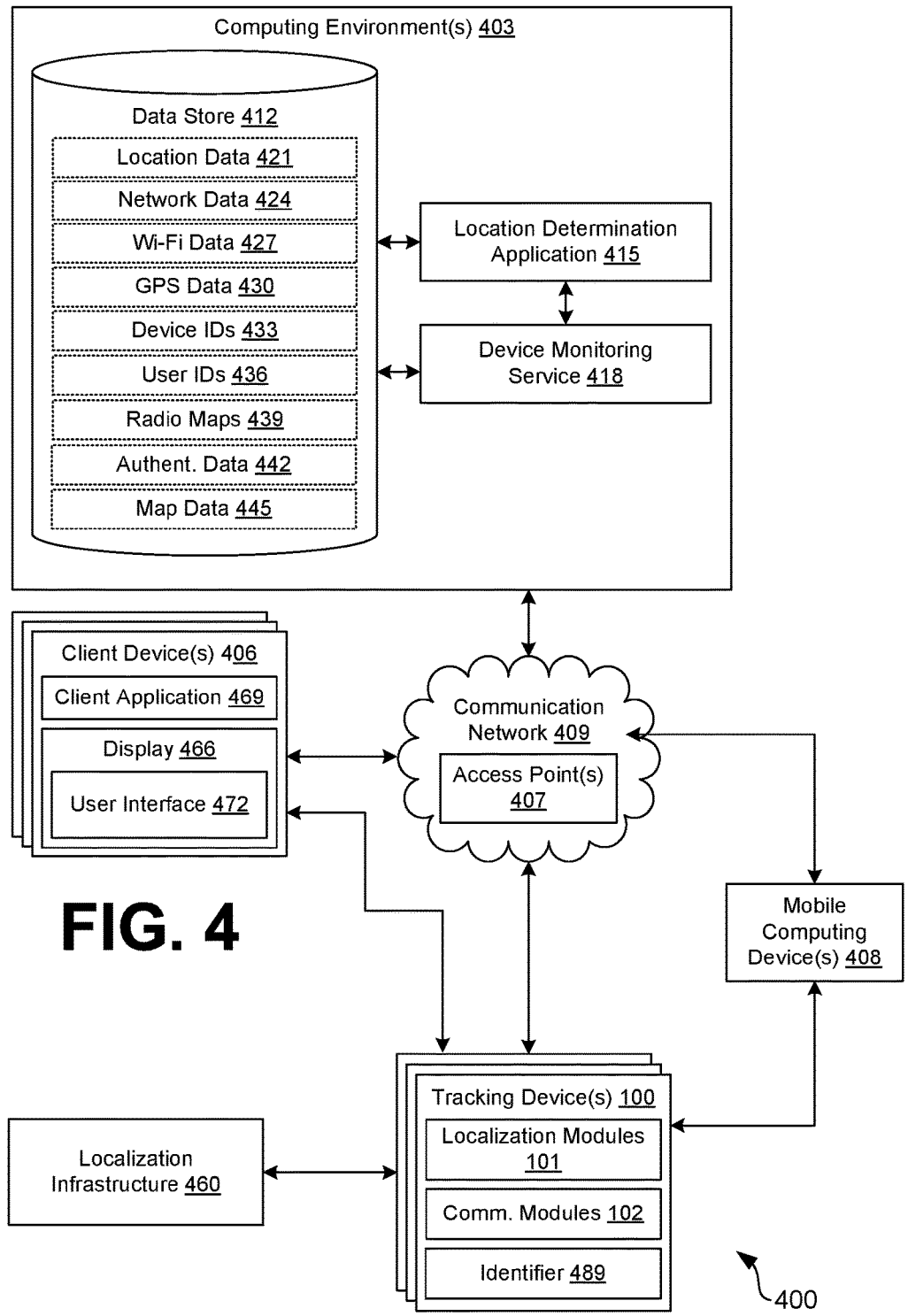
FIG. 4 is a drawing of a networked environment in communication with the tracking device according to various embodiments of the present disclosure.

Referring next to FIG. 4, shown are various aspects of a non-limiting example of architecture of an end-to-end system for monitoring the aforementioned tracking devices. FIG. 4 shows a networked environment 400 according to various embodiments. The networked environment 400 includes a computing environment 403, a client device 406, access points 407, and/or mobile computing devices 408 which are in data communication with each other via a communication network 409. The communication network 409 includes, for example, the Internet, intranets, extranets, wide area networks (WANs), local area networks (LANs), wired networks, wireless networks, or other suitable networks, etc., or any combination of two or more such networks. Localization Infrastructure may represent GPS or other satellites, cellular or other wireless network, RFID reader network, Bluetooth hotspots network, etc.

Access points 407 may include, for example, wireless access points 407, such as a GSM cell tower or other type of cell tower, Wi-Fi router/AP, Bluetooth AP, WLAN station, or other device, that may be used to facilitate communication between a tracking device 100 and the communication network 409 and may also be used to determine the location of tracking device. That means, as per various embodiments, localization infrastructure 460 and communication network 409 may represent the same physical entity. Such cellular networks may be capable of communicating, for example, via Code Division Multiple Access (CMDA), Global System for Mobile Communications (GSM), and/or any other communication protocol or variation thereof. Utilizing a GSM network, GPRS services may be used for communication between the access points 407 and the one or more tracking devices 100.

Accordingly, a respective one of the access points 407 may receive communication from one or more tracking devices 100, translate the communication received into a form of communication (e.g., Ethernet frames) capable of being communicated over the network 409, and transmit the communication to, for example, the computing environment 403 or the client device 406. However, according to various embodiments, a tracking device 100 may be capable of communicating directly with the network 409 without having to communicate through an intermediary device, such as the access points 407, or may be capable of communicating directly with the mobile computing devices 408, etc., as may be appreciated. Also, according to various embodiments, a tracking device 100 may be capable of communicating directly with the client device(s) 406.

The computing environment 403 may comprise, for example, a server computer or any other system providing computing capability. Alternatively, the computing environment 403 may employ a plurality of computing devices that are arranged, for example, in one or more server banks, computer banks, or other arrangements. Such computing devices may be located in a single installation or may be distributed among many different geographical locations. For example, the computing environment 403 may include a plurality of computing devices that together may comprise a cloud computing resource, a grid computing resource, and/or any other distributed computing arrangement. In some cases, the computing environment 403 may correspond to an elastic computing resource where the allotted capacity of processing, network, storage, or other computing-related resources may vary over time.

Various applications and/or other functionality may be executed in the computing environment 403 according to various embodiments. Also, various data is stored in a data store 412 that is accessible to the computing environment 403. The data store 412 may be representative of a plurality of data stores 412 as can be appreciated. The data stored in the data store 412, for example, is associated with the operation of the various applications and/or functional entities described below.

The components executed on the computing environment 403, for example, may include a location determination application 415, a device monitoring service 418, and other applications, services, processes, systems, engines, or functionality not discussed in detail herein. The location determination application 415 may be used to determine the location of one or more tracking devices 100 under infrastructure-based, infrastructure-less and/or passive localization methods. For example, location data 421 may comprise a GPS reading of a mobile computing device and RSSI of beacon signal (infrastructure-less localization) from a tracking device. A location determination application may process this GPS reading and RSSI to infer position accuracy and position of the tracking device. As a non-limiting example, the location determination application 415 may employ triangulation, trilateration, fingerprint matching, and nearest neighbor techniques, etc., to determine the location of the tracking device 100.

The device monitoring service 418 is executed to provide an interface thereby permitting a user to monitor one or more tracking devices 100. For example, the device monitoring service 418 may obtain location data 421 from the location determination application 415 for one or more tracking devices 100. Subsequently, the location data 421 may be transmitted by the device monitoring service 418 to one or more mapping application programming interfaces (API), such as the mapping APIs offered by Google® or Bing®. In response, a digital map comprising one or more indicators (e.g., icons) identifying the location of one or more tracking devices 100 on the digital map may be received by the device monitoring service 418. The digital map may be encoded in a user interface 472 (e.g., a network page, a mobile application page, etc.) and transmitted to a client device 406 (FIG. 4) for rendering, as will be described in greater detail below.

The device monitoring service 418 may be further configured to authenticate one or more users using authentication data (i.e., requiring a user to provide a user name, password, biometric data, etc.) prior to the transmission of any information associated with the tracking devices 100, such as a respective location. Even further, particular users may be associated with particular tracking devices 100. To this end, a particular user may only access information pertaining to tracking devices 100 authorized to that particular user.

The data stored in the data store 412 includes, for example, location data 421, network data 424, Wi-Fi data 427, GPS data 430, device identifiers (IDs) 433, user IDs 436, radio maps 439, authentication data 442, map data 445, and potentially other data. Location data 421 may comprise, for example, data obtained from one or more tracking devices 100 that may be related to and/or may be used in determining the location of the one or more tracking devices 100 via the location determination application 415. Moreover, location data 421 may comprise a position database of all tracking devices 100, whether functional or non-functional, including a last known location.

Wi-Fi data 427 may comprise information associated with utilizing access points 407 to determine a location of a tracking device 100, such as the location of a respective one of the access points 407. GPS data 430 may comprise information obtained by a tracking device 100 configured to localize via GPS. A device ID 433 may comprise, for example, a unique identifier used to identify a tracking device 100 and/or a group of tracking devices 100. A radio map 439 may comprise, for example, an RF signature map and/or an RF signature map history. A radio map 439 may further comprise associations to points on a digital map.

Authentication data 442 may comprise user names, passwords, biometric data, or any other information that may be used to authenticate a user of the device monitoring service 418 prior to transmission of any information associated with the tracking devices 100. Map data 445 may comprise any information associated with encoding locations of the tracking devices 100 in a digital map. Further, map data 445 may comprise historical archives of previously generated digital maps.

The client device 406 is representative of a plurality of client devices 406 that may be coupled to the network 409. The client device 406 may comprise, for example, a processor-based system, such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client device 406 may include a display 466. The display 466 may comprise, for example, one or more devices such as liquid crystal displays (LCDs), gas plasma-based flat panel displays, organic light emitting diode (OLED) displays, LCD projectors, or other types of display devices, etc.

The client device 406 may be configured to execute various applications such as a client application 469 and/or other applications. The client application 469 may be executed in a client device 406, for example, to access network content served up by the computing environment 403 and/or other servers, thereby rendering a user interface 472 on the display 466. To this end, the client application 469 may comprise, for example, a browser, a dedicated application, etc., and the user interface 472 may comprise a network page, an application screen, etc. The client device 406 may be configured to execute applications beyond the client application 469 such as, for example, email applications, social networking applications, word processors, spreadsheets, and/or other applications.

The tracking device 100 may comprise, for example, one or more communication modules 102 and one or more localization modules 101. Some or all localization and communication modules may represent the same physical entities; for instance a GSM/GPRS module may be used for localization as well as communication. To this end, the localization modules 101 may utilize Wi-Fi, GPS, GSM/GPRS, Ultrasonic, Infrared, RF, Bluetooth, Z-wave, ZigBee, and/or any similarly employable technology. Further, the communication modules 102 may communicate via Wi-Fi, Satellite, GSM/GPRS, Ultrasonic, Infrared, RF, Bluetooth, Z-wave, ZigBee, and/or any similarly employable communication technology. As may be appreciated, the communication modules 102 and localization modules 101 may include one or more receivers, transceivers, transmitters, and/or other communication circuitry. The tracking device 100 may further comprise an identifier 489, such as a unique identifier 489, that may be used by the location determination application 415 in recognizing and determining a location for the tracking device 100.

Next, a general description of the operation of the various components of the networked environment 400 is provided. As may be appreciated, the location determination application 415 is configured to determine the location for one or more tracking devices 100. To this end, location data 421 may be received from one or more tracking devices 100 over the communication network 409. As can be imagined, the location data 421 may take many forms specific to the technology used by the tracking device 100 in obtaining the location data 421. For example, if the location data 421 was obtained through the GPS module 103 (FIG. 1B), location data 421 may comprise, for example, a longitude and latitude of the tracking device 100. Alternatively, in the event that localization through the GPS module 103 was unable to be established, location data 421 may be obtained via the GSM/GPRS module 106 (FIG. 1B). Similarly, in the event that localization through the GSM/GPRS module 106 was unable to be established, location data 421 may be obtained via the Wi-Fi module 109 (FIG. 1B). Accordingly, the location data 421 received from the tracking device 100 may be used in the determination of a location of the tracking device 100.

Subsequent to receiving the location data 421 for a respective tracking device 100, the location determination application 415 may utilize triangulation, trilateration, fingerprint matching, nearest neighbor techniques, etc., to determine the location of the tracking device 100. The location may be converted from a first form to a second form, if necessary. For example, an address of an access point 407 may be converted to a geocode comprising a longitude and latitude for use by the mapping API. Upon determination of the location of for the one or more tracking devices 100, the location determination application 415 may store the location data 421 and/or the determined location in the data store 412 in association with a tracking device 100 and/or its identifier 489. Accordingly, a history of the location data 421 may be accessed periodically and subsequently used in determining the location of a tracking device 100 over time and/or to deliver value added location based services such as paths traveled, places visited, lengths of time in a location, etc.

The device monitoring service 418 is executed to provide an interface that permits a user to monitor one or more tracking devices 100 associated with the user. For example, the device monitoring service 418 may obtain location data 421 from the location determination application 415 or from the data store 412. Subsequently, the location data 421 may be transmitted by the device monitoring service 418 to a mapping API such as Google® Maps, Bing® Maps, Yahoo!® Maps, AOL® MapQuest, a proprietary mapping interface, and/or any other mapping API. In response, a map comprising one or more indicators (e.g., icons) identifying the location of tracking device 100 on a map may be received by the device monitoring service 418. The digital map received may be encoded in a user interface 472 (e.g., a network page, a mobile application page, etc.) and transmitted to a client device 406 for rendering. The user interface 472 may comprise additional information about the tracking devices 100 such as longitude and latitudes, geocoded addresses, durations at a location, routes traveled, and/or any other information about the tracking devices 100, as will be discussed in greater detail below.

As may be appreciated, the device monitoring service 418 may require authentication from a user before providing the user with information associated with one or more of the tracking devices 100. To this end, a unique user account or user ID 436, used to authenticate the user, may be associated with one or more tracking devices 100. As a result, only information pertaining to tracking devices 100 associated with an account or user ID 436 may be presented to that user.

Figure 5:
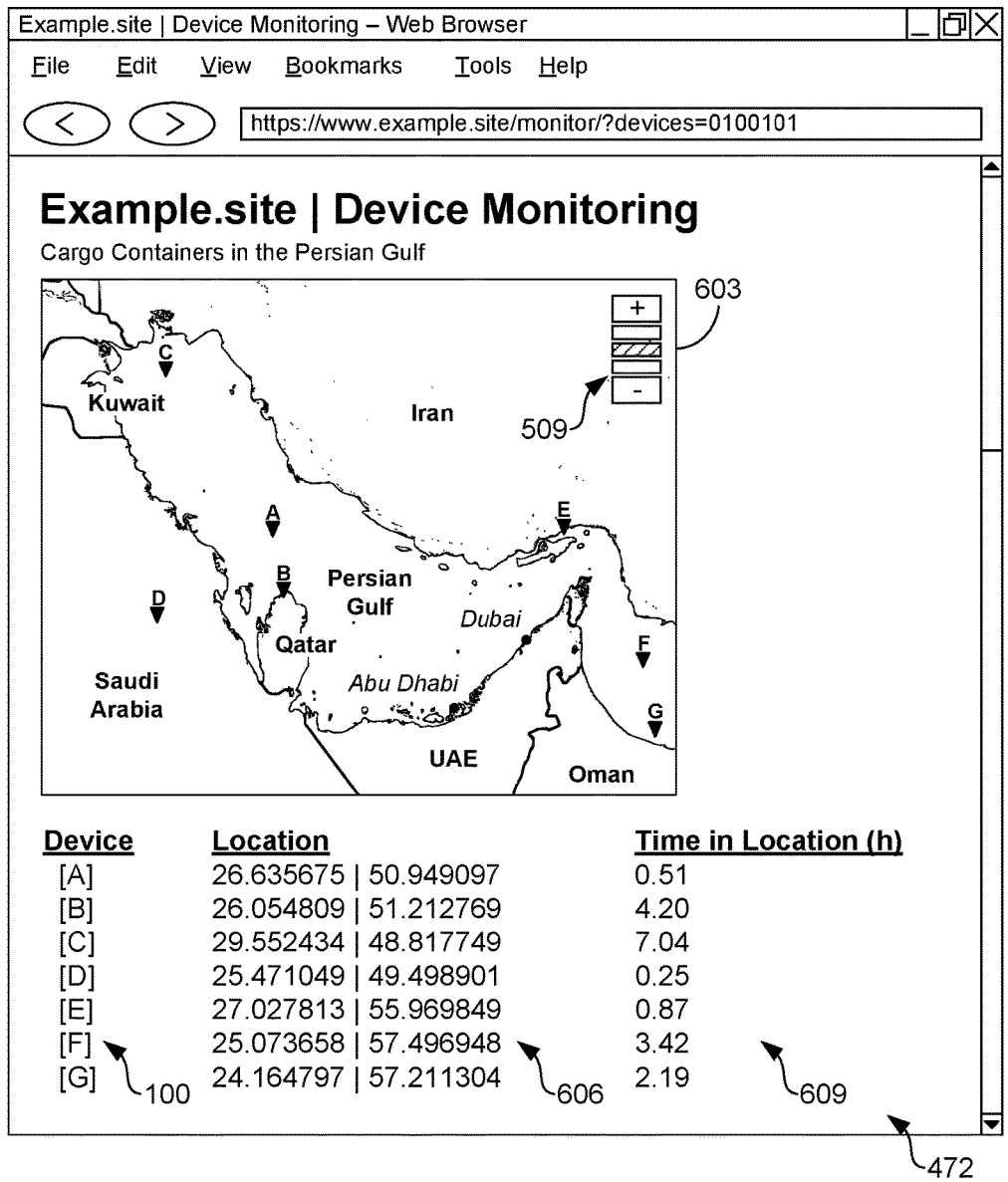
FIG. 5 is a drawing of an example of a user interface rendered by a client device in the networked environment of FIG. 4 according to various embodiments of the present disclosure.

Referring next to FIG. 5, shown is an exemplary embodiment of a user interface 472 rendered in a client application 469, for example, on a client device 406 (not shown). In the non-limiting example of FIG. 5, the device monitoring service 418 (FIG. 4) may render a user interface 472 comprising a digital map 603. As discussed above with respect to FIG. 4, the determined locations of one or more tracking devices 100 (FIGS. 1A-1B) may be transmitted to a mapping service by communicating, for example, through a mapping API offered by the mapping service, as described above. In return, the mapping service provides the device monitoring service 418 with a static or dynamic digital map 603 comprising the determined locations denoted with one or more icons. As shown in FIG. 5, the digital map 603 comprises icons labeled A-G, each icon representing a location of a corresponding tracking device 100.

According to various embodiments, the digital map 603 may be updated or refreshed in real-time by making subsequent calls to the mapping API upon a request by a user or upon the occurrence of a predefined condition. For example, the digital map 603 may be updated and/or re-rendered upon a predefined delay and/or upon non-negligible movement of a tracking device 100. To this end, the network page may use pushing or polling techniques to determine whether there is a change in the location of a tracking device 100. As the embodiment of FIG. 5 depicts a network page, asynchronous JavaScript and extensive markup language (AJAX) may be employed to make subsequent calls to the mapping API without requiring a manual reload of the network page by the user.

Additional information associated with the tracking devices 100 may be encoded in the user interface 472. For example, a plurality of locations 606 for each tracking device 100 may be determined utilizing geocoding or similar techniques. In the non-limiting example of FIG. 5, the location for each tracking device 100 comprises a longitude and latitude. Additionally, statistics associated with the location of the tracking device 100 may be determined and encoded in the network page. For example, a time in a location metric 609 may be encoded in the network page to show a length of time a tracking device 100 has remained in a particular position or range of positions.

As may be appreciated, the device monitoring service 418 may require the user to authenticate oneself prior to accessing the user interface 472. Accordingly, a user account or user ID 436 (FIG. 4) used during authentication may be associated with one or more tracking devices 100. As a result, only information pertaining to tracking devices 100 associated with an account or user ID 436 may be presented in the user interface 472.

Figure 6:
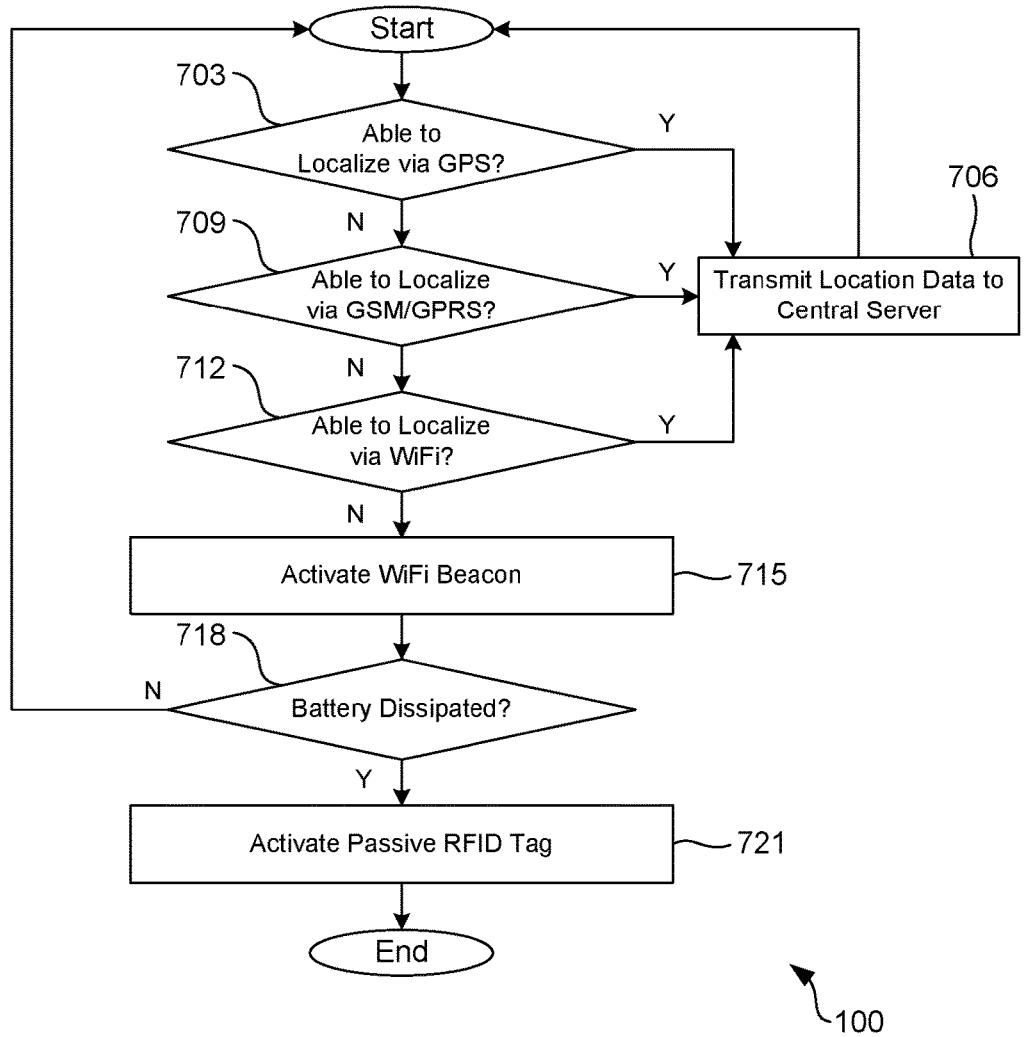
FIG. 6 is a flowchart illustrating one example of functionality implemented as portions of the tracking device according to various embodiments of the present disclosure.

Turning now to FIG. 6, shown is a flowchart that provides one example of the operation of the tracking device 100 according to various embodiments. It is understood that the flowchart of FIG. 6 provides merely an example of the many different types of functional arrangements that may be employed to implement the operation the tracking device 100 as described herein. As an alternative, the flowchart of FIG. 6 may be viewed as depicting an example of a method implemented in the microcontroller 127 (FIG. 1B) according to one or more embodiments.

Beginning with 703, it is determined, via the tracking device 100, whether the tracking device 100 is able to localize via GPS. As discussed above with respect to FIG. 1, the GPS module 103 (FIG. 1B) of the tracking device 100 may capture signals from GPS satellites. These signals may be processed to determine a location of the tracking device 100. Accordingly, the GPS module 103 provides a layer of tracking that is capable of localizing the tracking device 100 in situations where GPS signal strength is capable of receiving GPS data 430. For example, when the tracking device 100 is located outdoors with a clear sky, the GPS module 103 may be employed in the localization of the tracking device 100.

If the tracking device 100 is able to localize via GPS, in 706, the location data 421 may be transmitted to the central server 503, such as the computing environment 403 (FIG. 4) described above. Alternatively, if the tracking device 100 is unable to localize via the GPS module 103, the tracking device 100 proceeds to determine whether the tracking device 100 is able to localize via GSM/GPRS, as shown in 709, or any other localization method such as Ultrasonic, Z-wave, ZigBee, Bluetooth, etc. As discussed above, the GSM/GPRS module 106 (FIG. 1B) is configured to scan GSM frequency bands to locate one or more visible GSM cellular towers that may be used in the localization of the tracking device 100.

If the tracking device 100 is able to localize via GSM/GPRS, for example, upon the detection of or the communication with one or more GSM cellular towers, an identifier of the one or more GSM cellular towers and/or a respective signal strengths may be communicated to a central server 503 as location data 421 for determination of the location of the tracking device 100, as shown in 706. The GSM/GPRS layer of localization may be used to localize the tracking device 100 in outdoor and indoor situations with weak GPS signals, such as underground, inside tunnels, urban areas, inside warehouses, inside parking garages, etc.

Alternatively, if the tracking device 100 is unable to localize via GPS (703) and is unable to localize via GSM/GPRS (709), in 712, it is determined whether the tracking device 100 is able to localize via Wi-Fi. As discussed above, the Wi-Fi module 109 (FIG. 1B) is configured to scan Wi-Fi frequency bands and send any visible and detected Wi-Fi access point (AP) identifiers and/or respective signal strengths to a central server. The Wi-Fi layer of localization may be used to localize the tracking device 100 in indoor locations which may have been pre-mapped (i.e., locations in which their RF infrastructure has been added or registered in a database accessible by the central server 503) or covered by a relevant third-party database (e.g., OpenCellID). These locations may include warehouses, neighborhoods, apartment complexes, seaports, airports, etc.

If the device is able to localize via Wi-Fi, the location data 421 may be transmitted to the central server 503, as shown in 706. Otherwise, in 715, the tracking device 100 may broadcast a Wi-Fi signal by activating a Wi-Fi beacon. To this end, the tracking device 100 acts as a wireless access point 407, capable of detection by the mobile computing device 408 (FIG. 4). As may be appreciated, the mobile computing device 408 may generate acoustic and/or visual cues to guide an operator of the mobile computing device towards the location of the tracking device 100 according to readings obtained from the Wi-Fi signal. In one or more aspects, this mode of Wi-Fi based beaconing, may ordinarily be in sleep condition and be activated when the aforementioned infrastructure-based localization mechanisms fail to locate the tracking device, thus saving battery life.

This beaconing (Infrastructure-less) layer of tracking localizes the tracking device 100 in indoor situations (such as warehouses or silos) which have no Wi-Fi or RF infrastructure or in circumstances when databases of installed infrastructure are not available. The infrastructure-based mechanisms described above provide a trail of the vicinity of an unregistered indoor location, and, utilizing the mobile computing device 408, a location of the tracking device 100 may be pin-pointed in an indoor or outdoor location without existing infrastructure.

The process proceeds to 718 to determine whether the battery 121 (FIG. 1B) has dissipated to render the communication modules 102 and/or localization modules 101 within the tracking device 100 inoperable. For example, a life of the battery 121 may be actively and periodically monitored by the microcontroller 127 such that if the life of the battery 121 dips below a predefined threshold, then a passive RFID tag 124 may be activated (721). According to various embodiments, the passive RFID tag 124 may always be active. The RFID tag 124 is configured to be read using an appropriate mobile computing device 408, such as the handheld device described above that is also capable of reading and/or detecting Wi-Fi signals.

As described above, the mobile computing device 408 may generate acoustic and/or visual cues to guide an operator towards the location of the tracking device 100 according to readings obtained from the RFID tag 124. The mobile computing device 408 may transmit the location data 421 of the tracking device 100 to the computing environment 403 utilizing the hardware on the mobile computing device 408 (e.g., cellular hardware and Wi-Fi). Accordingly, the RFID layer of tracking localizes the tracking device 100 in situations when the battery 121 has dissipated and/or when the tracking device 100 is unable to employ the active localization techniques described above. Mobile computing device may also have localization mechanisms onboard to determine location of the mobile computing device. This location of mobile computing device may be combined with "infrastructure-less" or "passive" localization data of tracking device for positioning of the tracking device.

Further, the use of the RFID tag 124 in tracking does not require infrastructure (e.g., Wi-Fi access points, cellular towers). Although the flowchart of FIG. 6 describes the tracking device 100 utilizing a GPS module 103, a GPS/GPRS module 106, a Wi-Fi module 109, and an RFID tag 124, other receivers, transceivers, or tags may be utilized to permit the tracking device 100 to localize via alternative localization strategies. For example, other communication modules 102 or localization modules 101 may be employed using technologies such as Ultrasonic, Z-wave, ZigBee, Bluetooth, NFC, etc.

According to various embodiments, the flowchart of FIG. 6 may be performed in continuous cycles for predefined periodic intervals. For example, a tracking device 100 may comprise an active mode of operation and/or a sleep mode of operation. The sleep mode may comprise power conservation and may be operated by the microcontroller 127 to prolong a charge of the battery 121. The microcontroller 127 may enter the tracking device 100 into an active mode whereby the flowchart of FIG. 6 is performed according to remotely configurable predefined intervals.

Figure 7:
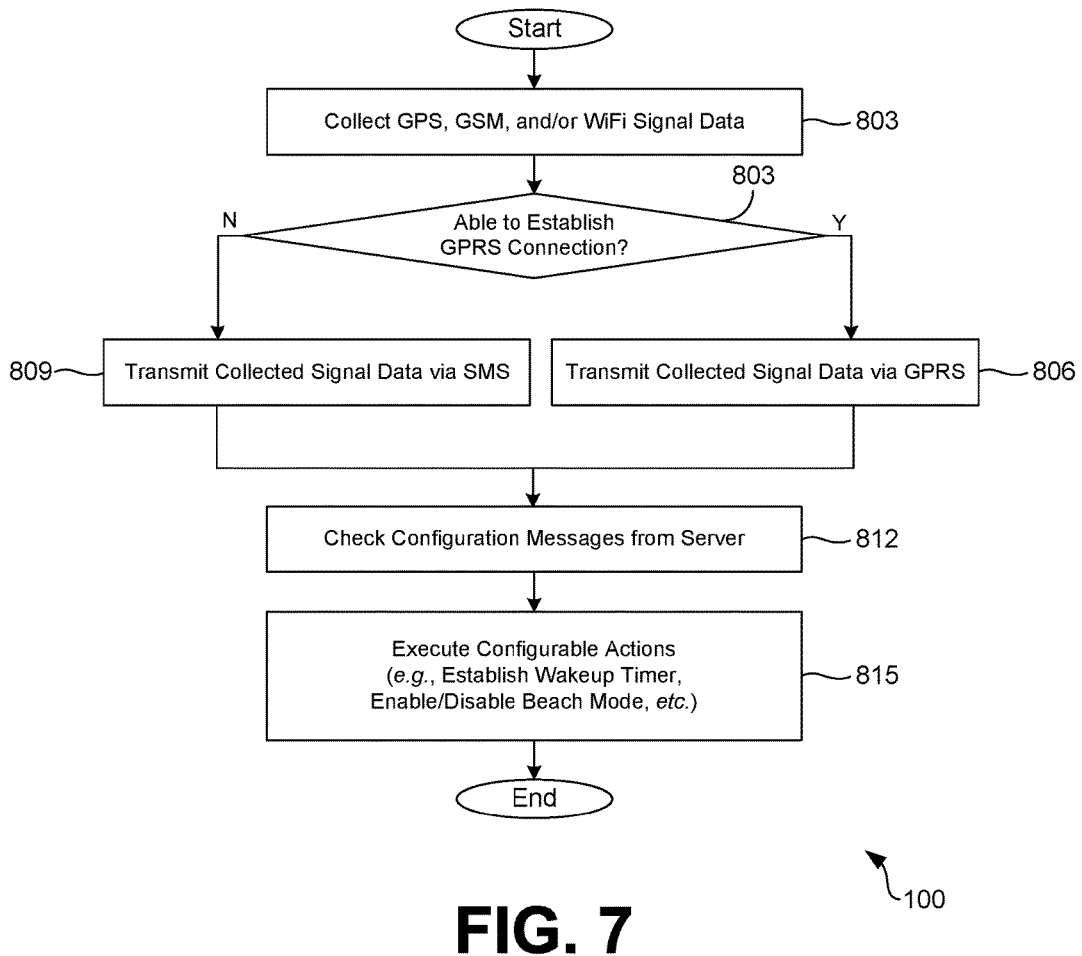
FIG. 7 is a flowchart illustrating another example of functionality implemented as portions of the tracking device according to various embodiments of the present disclosure.

Referring next to FIG. 7, shown is a flowchart that provides an alternative example of the operation of the tracking device 100 according to various embodiments. It is understood that the flowchart of FIG. 7 provides merely an example of the many different types of functional arrangements that may be employed to implement the operation the tracking device 100 as described herein. As an alternative, the flowchart of FIG. 7 may be viewed as depicting an example of a method implemented in the microcontroller 127 (FIG. 1B) according to one or more embodiments.

Beginning with 803, GPS, GSM, and/or Wi-Fi signal data may be obtained via the tracking device 100 utilizing, for example, the GPS module 103 (FIG. 1B), the GSM/GPRS module 106 (FIG. 1B), and/or the Wi-Fi module 109 (FIG. 1B). Next, in 806, it is determined whether a GPRS connection is able to be established via the GSM/GPRS module 106. If the GPRS connection is able to be established, the collected signal data may be transmitted to the computing environment 403 (FIG. 4), as shown in 806. Alternatively, if the GRPS connection is unable to be established, the collected signal data may be transmitted utilizing a simple messaging service (SMS), as shown in 809, or a similar service.

Next, in 812, the tracking device 100 may check for configuration messages that may be received from the central server 503 and/or memory inside communication network. Next in 815, the tracking device 100 executes configurable or reconfigurable actions according to data specified in configurations messages. For instance, a wakeup timer may be established such that the tracking device 100 periodically attempts localization by utilizing the localization modules 101.

In some embodiments, the tracking device 100, the modules, and/or other components of the tracking device 100 can be kept in a shutdown or low-power state to save power (e.g., battery life). The tracking device 100, the modules, and/or other components of the tracking device 100 can be awoken at periodic intervals or based on performance of a predefined task. In one example, the tracking device 100 can comprise a motion sensor that awakes the tracking device 100 based on detection of a motion. In another example, the tracking device 100 can comprise an accelerometer that awakens the tracking device 100 based on movements of the tracking device 100. Configuration messages can be stored in network memory (e.g., memory of a server or other remote computing device) or a buffer until the tracking device 100 exits its shutdown, low power, and/or sleep state. When the tracking device 100 is awakened, the configuration messages can be communicated to the tracking device 100.

The wakeup timer can be established as set forth in configuration messages received from the central server 503. Similarly, in 815, configurable actions can be executed. In some embodiments, configurable actions can include activating a beacon mode by generating suitable configuration messages at the central server 503. The beacon mode can comprise emitting a Wi-Fi signal via the Wi-Fi module 109 and/or activating the passive RFID tag 124 (FIG. 1B). Accordingly, the central server 503 may remotely alter a state of the tracking device 100. Beacon mode can also be activated incase the tracking device is unable to establish communication with server.

In further embodiments, infrastructure-less localization mechanisms on the tracking device 100 can be performed while the tracking device 100 is in a powered-down, low-power, or sleep state. For example, hardware resources used in the infrastructure-less technique can be continuously or periodically activated. In one example, a Wi-Fi module of the tracking device 100 can be used for communication or infrastructure-based localization. An activation of an infrastructure-less localization mechanism can be performed in response to, for example, receipt of a signal or other communication from the tracking device 100 at the server, receipt of a relevant configuration message from the server at the tracking device 100, receipt of a configuration message from a mobile computing device, and/or failure to establish or maintain communication with a server.

Figure 8:
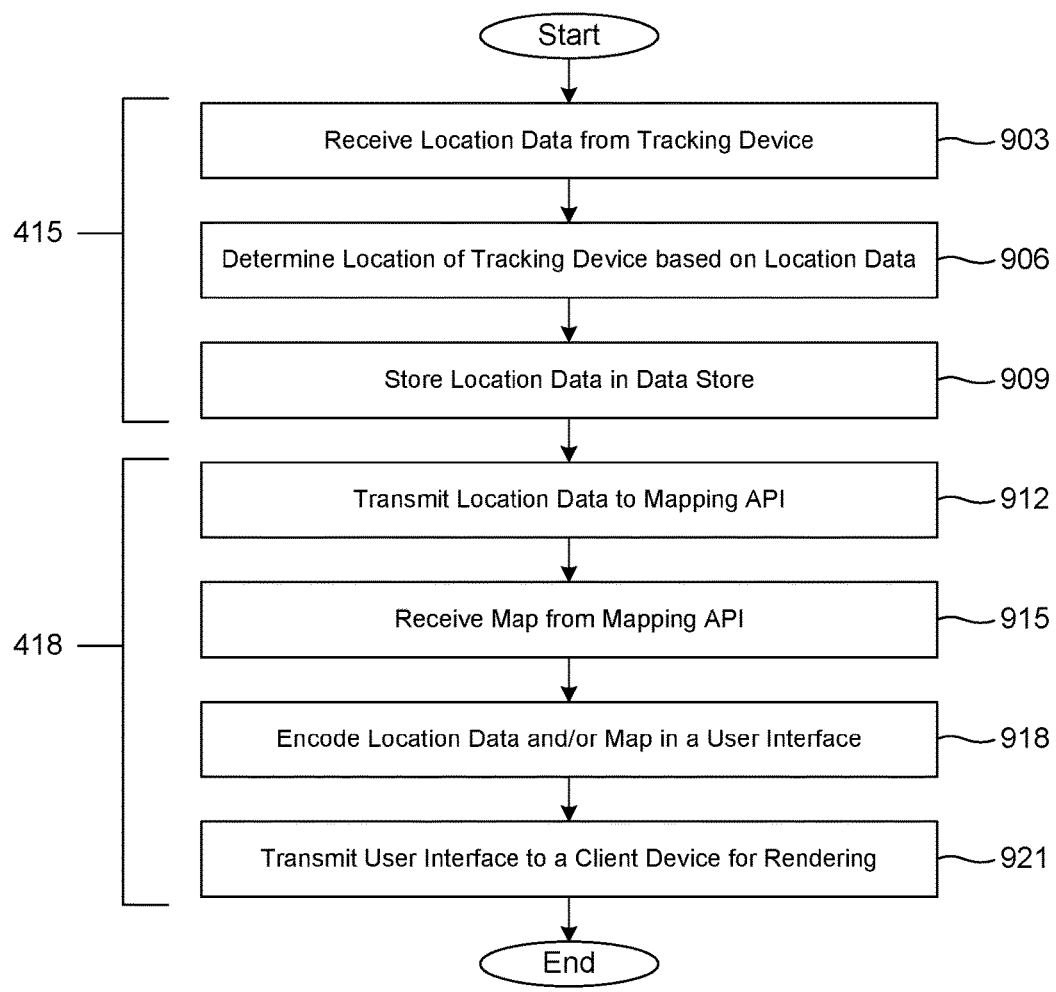
FIG. 8 is a flowchart illustrating one example of functionality implemented as portions of a location determination application and/or a device monitoring service executed in a computing environment in the networked environment of FIG. 4 according to various embodiments of the present disclosure.

Moving on to FIG. 8, shown is a flowchart that provides one example of the operation of a portion of the location determination application 415 and/or the device monitoring service 418 according to various embodiments. It is understood that the flowchart of FIG. 8 provides merely an example of the many different types of functional arrangements that may be employed to implement the operation of the portion of the location determination application 415 and/or the device monitoring service 418 as described herein. As an alternative, the flowchart of FIG. 8 may be viewed as depicting an example of a method implemented in the computing environment 403 (FIG. 4) according to one or more embodiments.

Beginning with 903, location data 421 (FIG. 4) may be received from one or more tracking devices 100. As discussed above with respect to FIG. 6, location data 421 may be obtained via GPS or any alternative form of localization. If the location data 421 was obtained through a GPS receiver, location data 421 may comprise, for example, a longitude and latitude of the tracking device 100. Alternatively, in the event that localization through GPS was unable to be established by a tracking device 100, a tracking device 100 may have obtained location data 421 via GSM/GPRS or via Wi-Fi, etc. The location data 421 may be transmitted by the tracking device 100 to a computing environment 403 over the network 409 (FIG. 4) utilizing the wireless access points 407, the mobile computing devices 408, or like devices.

In 906, the location data 421 received from the tracking device 100 may be used to determine a location of the tracking device 100. In addition, other data may be used in determining the location such as radio maps 439 (FIG. 4), etc. As a non-limiting example, the location determination application 415 may employ triangulation, trilateration, fingerprint matching, nearest neighbor techniques, etc., to determine the location of the tracking device 100. Localization of the tracking device 100 may employ the use of radio maps 439 as described in co-pending U.S. patent application Ser. No. 13/799,272 entitled "PRINTED TAG REAL-TIME TRACKING," filed on Mar. 13, 2013, which is hereby incorporated by reference herein in its entirety.

Next, in 909, the location data 421, and/or the location itself, may be stored in data store 412 (FIG. 4) in association with a tracking device 100 or its identifier 489 (FIG. 4). Accordingly, the location data 421 may be used in determining the location of a tracking device 100 over time, paths traveled, places visited, etc.

In 912, the location data 421 may be transmitted to a mapping API such as Google® Maps, Bing® Maps, Yahoo!® Maps, AOL® MapQuest, and/or any other mapping API. As may be appreciated, the location determined in 906 of a tracking device 100 (or many locations of many tracking devices 100) may be geocoded (if necessary) and transmitted to the mapping API. In response, a static or dynamic map, such as the digital map 603 (FIG. 5), may be received, in 915. In 918, the map received from the mapping service may be encoded in a user interface 472 (FIG. 4) (e.g., a network page, a mobile application screen). Finally, in 921, the user interface 472 may be transmitted to a client device 406 (FIG. 4) for rendering, such as a personal computer, a smartphone, or a tablet computing device.

Figure 9:
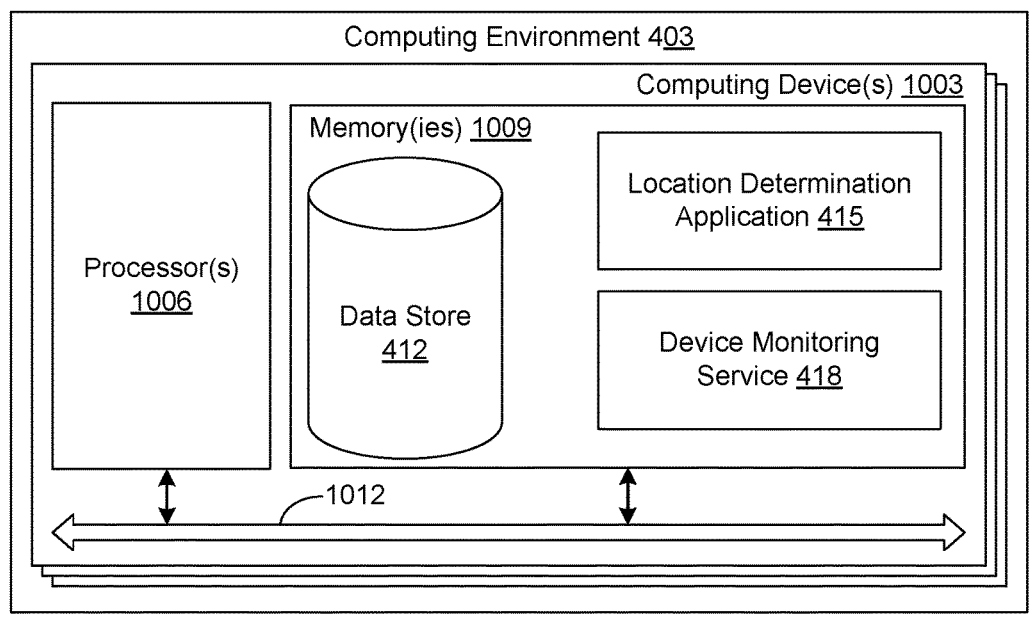
FIG. 9 is a schematic block diagram that provides one example illustration of a computing environment employed in the networked environment of FIG. 4 according to various embodiments of the present disclosure.

With reference to FIG. 9, shown is a schematic block diagram of the computing environment 403 according to various embodiments of the present disclosure. It is understood that the computing environment of FIG. 9 provides merely an example of the many different types of functional arrangements that may be employed. The computing environment 403 includes one or more computing devices 1003. Each computing environment 403 includes at least one processor circuit, for example, having a processor 1006 and a memory 1009, both of which are coupled to a local interface 1012. The local interface 1012 may comprise, for example, a data bus with an accompanying address/control bus or other bus structure as can be appreciated.

Stored in the memory 1009 are both data and several components that are executable by the processor 1006. For instance, location determination application 415, device monitoring service 418, and potentially other applications may be stored in the memory. Also stored in the memory 1009 may be a data store 412 and other data. In addition, an operating system may be stored in the memory 1009 and executable by the processor 1006.

It is understood that there may be other applications that are stored in the memory 1009 and are executable by the processor 1006 as can be appreciated. Software components may be implemented using one or more programming languages, for example, C, C++, C#, Objective C, Java®, JavaScript®, Perl, PHP, Visual Basic®, Python®, Ruby, Flash®, etc.

A number of software components are stored in the memory 1009 and are executable by the processor 1006. In this respect, the term "executable" means a program file that is in a form that can ultimately be run by the processor 1006. Examples of executable programs may be, for example, a compiled program that can be translated into machine code in a format that can be loaded into a random access portion of the memory 1009 and run by the processor 1006, source code that may be expressed in proper format such as object code that is capable of being loaded into a random access portion of the memory 1009 and executed by the processor 1006, or source code that may be interpreted by another executable program to generate instructions in a random access portion of the memory 1009 to be executed by the processor 1006, etc. An executable program may be stored in any portion or component of the memory 1009 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1009 is defined herein as including both volatile and nonvolatile memory and data storage components. Volatile components are those that do not retain data values upon loss of power. Nonvolatile components are those that retain data upon a loss of power. Thus, the memory 1009 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1006 may represent multiple processors 1006 and/or multiple processor cores and the memory 1009 may represent multiple memories 1009 that operate in parallel processing circuits, respectively. In such a case, the local interface 1012 may be an appropriate network that facilitates communication between any two of the multiple processors 1006, between any processor 1006 and any of the memories 1009, or between any two of the memories 1009, etc. The local interface 1012 may comprise additional systems designed to coordinate this communication, including, for example, performing load balancing. The processor 1006 may be of electrical or of some other available construction.

Although the location determination application 415, the device monitoring service 418, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 6, 7, and 8 show the functionality and operation of an implementation of portions of the tracking device 100, the location determination application 415, and the device monitoring service 418. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1006 in a computer system or other system. The machine code may be converted from the source code, etc. If embodied in hardware, each block may represent a circuit or a number of interconnected circuits to implement the specified logical function(s).

Although the flowcharts of FIGS. 6, 7, and 8 show a specific order of execution, it is understood that the order of execution may differ from that which is depicted. For example, the order of execution of two or more blocks may be scrambled relative to the order shown. Also, two or more blocks shown in succession in FIGS. 6, 7, and 8 may be executed concurrently or with partial concurrence. Further, in some embodiments, one or more of the blocks shown in FIGS. 6, 7, and 8 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the location determination application 415 and the device monitoring service 418, that comprises software or code can be embodied in any non-transitory computer-readable medium for use by or in connection with an instruction execution system such as, for example, a processor 1006 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

In addition to the forgoing, the various embodiments of the present disclosure include, but are not limited to, the embodiments set forth in the following clauses.

Clause 1. A device or system comprising at least two modules selected from a group consisting of: a localization module implementing at least one infrastructure-based localization technique; a localization module implementing at least one infrastructure-less localization technique; and a localization module implementing at least one passive localization technique.

Clause 2. The device or system of clause 1, wherein the at least one infrastructure-based localization technique is selected from a group consisting of: a satellite-based trilateration technique; a mobile communication technology; a networked wireless communication technique; and a short-range communication technique in a networked setting.

Clause 3. The device or system of any one of clauses 1-2, wherein the at least one infrastructure-less localization technique is selected from a group consisting of: a mobile communication technology, a networked wireless communication technique, and a short-range communication technique.

Clause 4. The device or system of any one of clauses 1-3, further comprising: at least one communication module; and at least one microcontroller configured to control the localization modules or the at least one communication module.

Clause 5. The device or system of any one of clauses 1-4, wherein at least a portion of the device is fabricated using conductive ink printing on a flexible substrate.

Clause 6. The device or system of any one of clauses 1-5, wherein the at least one passive localization technique is RFID or NFC or both.

Clause 7. The device or system of any one of clauses 1-6, wherein information obtained via the at least one infrastructure-based localization technique is utilized in determining a location using: the at least infrastructure-less localization technique or the at least one passive localization technique.

Clause 8. The device or system of any one of clauses 1-7, wherein the localization module implementing the at least one infrastructure-less localization technique is activated on the tracking device responsive to receipt of an instruction from a server computing device or a mobile computing device.

Clause 9. The device or system of any one of clauses 1-8, wherein the localization module implementing the infrastructure-less localization technique is activated responsive to an insufficient signal condition being detected by the localization module implementing the infrastructure-less localization technique or the localization module implementing the infrastructure-based localization technique.

Clause 10. The device or system of any one of clauses 1-9, wherein the device or system is configured to: keep at least one of the localization modules in a sleep state or a low power state for periodic activation; store a configuration message in network memory received from a server computing device over a communication network; and deliver the configuration message to at least one of the localization modules upon the periodic activation of the at least one of the localization modules.

Clause 11. A system, comprising: at least one tracking device attempting data communication with a server computing device, the at least one tracking device being configured to at least: attempt to determine a location of the at least one tracking device utilizing a first localization module within the tracking device; responsive to the location being undetermined utilizing the first localization module, attempt to determine the location of the at least one tracking device utilizing a second localization module within the at least one tracking device; responsive to the location being undetermined utilizing the second localization module, attempt to determine the location of the at least one tracking device utilizing a third localization module within the at least one tracking device; and responsive to the location being undetermined utilizing the third localization module, initiate transmission of a signal from the at least one tracking device, the signal being detectable by a mobile computing device.

Clause 12. The system of clause 11, wherein the first localization module or the second localization module is selected from a group consisting of a global positioning system (GPS) module, a global system for mobile communications (GSM) module, and a wireless fidelity (Wi-Fi) module.

Clause 13. The system of any one of clauses 11-12, wherein the signal further comprises a wireless fidelity (Wi-Fi) signal.

Clause 14. The system of any one of clauses 11-13, further comprising: a passive RFID tag detectable by the mobile computing device when a power source of the at least one tracking device is depleted; and a microcontroller configured to control a first communication module, a second communication module, a third communication module, the passive RFID tag, or a combination thereof.

Clause 15. The system of any one of clauses 11-14, wherein the tracking device is configured to transmit location data to the server computing device responsive to the data communication being established, the location data obtained by a first communication module, a second communication module, or a third communication module.

Clause 16. A method, comprising: receiving, by a server computing device, location data obtained by a tracking device, wherein the tracking device is configured to: attempt to determine a location of the tracking device utilizing a first localization module within the tracking device; responsive to the location being undetermined utilizing the first localization module, attempt to determine the location of the tracking device utilizing a second localization module within the tracking device; responsive to the location being undetermined utilizing the second localization module, attempt to determine the location of the tracking device utilizing a third localization module within the tracking device; responsive to the location being undetermined utilizing the third localization module, initiate transmission of a signal from the tracking device, the signal being detectable by a mobile computing device, the signal comprising the location data; and determine, by the server computing device, a location of the tracking device utilizing at least an identifier corresponding to the tracking device and the location data received from the tracking device.

Clause 17. The method of clause 16, wherein: the first localization module or the second localization module is selected from a group consisting of a global positioning system (GPS) module, a global system for mobile communications (GSM) module, and a wireless fidelity (Wi-Fi) module; and the determining, by the server computing device, the location utilizes triangulation, trilateration, fingerprint matching, or a nearest neighbor method.

Clause 18. The method of any one of clauses 16-17, wherein the signal further comprises a wireless fidelity (Wi-Fi) signal.

Clause 19. The method of any one of clauses 16-18, wherein the at least one tracking device further comprises a passive RFID tag detectable by the mobile computing device when a power source of the tracking device is depleted.

Clause 20. The method of any one of clauses 16-19, wherein the location data is received by the server computing device from the mobile computing device over a network upon a detection of the signal by the mobile computing device.

Clause 21. The method of any one of clauses 16-20, wherein the tracking device is configured to transmit location data to the server computing device responsive to data communication being established, the location data obtained by the first localization module, the second localization module, or the third localization module.

Clause 22. The method of clause 21, wherein the location data is obtained by at least two of the first, second and third localization modules.

Clause 23. The method of any one of clauses 16-21, further comprising: communicating, by the server computing device, the location data received from the tracking device to a mapping service via an application programming interface (API); receiving, by the server computing device, a map comprising at least one indicator representing the tracking device at a corresponding location in the map; encoding, by the server computing device, the map in a user interface; and sending, by the server computing device, the user interface to a client device for display.

METHOD OF INDUSTRIAL APPLICATION OF INVENTION

This invention has industrial application in the field of communications, device tracking, and related fields.

Therefore, the following is claimed:

1. A system, comprising:
at least one tracking device attempting data communication with a server computing device, the at least one tracking device being configured to at least:
   attempt to determine a location of the at least one tracking device utilizing a first localization module within the at least one tracking device;
   responsive to the location being undetermined utilizing the first localization module, attempt to determine the location of the at least one tracking device utilizing a second localization module within the at least one tracking device;
   responsive to the location being undetermined utilizing the second localization module, attempt to determine the location of the at least one tracking device utilizing a third localization module within the at least one tracking device; and
   responsive to the location being undetermined utilizing the third localization module, initiate transmission of a signal from the at least one tracking device, the signal being detectable by a mobile computing device.

2. The system of claim 1, wherein the first localization module or the second localization module is selected from a group consisting of a global positioning system (GPS) module, a global system for mobile communications (GSM) module, and a wireless fidelity (Wi-Fi) module.

3. The system of claim 1, wherein the signal further comprises a wireless fidelity (Wi-Fi) signal.

4. The system of claim 1, further comprising:
a passive RFID tag detectable by the mobile computing device when a power source of the at least one tracking device is depleted; and
a microcontroller configured to control a first communication module, a second communication module, a third communication module, the passive RFID tag, or a combination thereof.

5. The system of claim 1, wherein the at least one tracking device is configured to transmit location data to the server computing device responsive to the data communication being established, the location data obtained by a first communication module, a second communication module, or a third communication module.

6. A method, comprising:
receiving, by a server computing device, location data obtained by a tracking device, wherein the tracking device is configured to:
   attempt to determine a location of the tracking device utilizing a first localization module within the tracking device;
   responsive to the location being undetermined utilizing the first localization module, attempt to determine the location of the tracking device utilizing a second localization module within the tracking device;
   responsive to the location being undetermined utilizing the second localization module, attempt to determine the location of the tracking device utilizing a third localization module within the tracking device;
   responsive to the location being undetermined utilizing the third localization module, initiate transmission of a signal from the tracking device, the signal being detectable by a mobile computing device, the signal comprising the location data; and
   determine, by the server computing device, a location of the tracking device utilizing at least an identifier corresponding to the tracking device and the location data received from the tracking device.

7. The method of claim 6, wherein:
the first localization module or the second localization module is selected from a group consisting of a global positioning system (GPS) module, a global system for mobile communications (GSM) module, and a wireless fidelity (Wi-Fi) module; and
the determining, by the server computing device, the location utilizes triangulation, trilateration, fingerprint matching, or a nearest neighbor method.

8. The method of claim 6, wherein the signal further comprises a wireless fidelity (Wi-Fi) signal.

9. The method of claim 6, wherein the at least one tracking device further comprises a passive RFID tag detectable by the mobile computing device when a power source of the tracking device is depleted.

10. The method of claim 6,
wherein the location data is received by the server computing device from the mobile computing device over a network upon a detection of the signal by the mobile computing device; and
wherein the tracking device is configured to transmit location data to the server computing device responsive to data communication being established, the location data obtained by the first localization module, the second localization module, or the third localization module,
the method further comprising:
   communicating, by the server computing device, the location data received from the tracking device to a mapping service via an application programming interface (API);
   receiving, by the server computing device, a map comprising at least one indicator representing the tracking device at a corresponding location in the map;
   encoding, by the server computing device, the map in a user interface; and
   sending, by the server computing device, the user interface to a client device for display.

* * * * *